United States Patent
Oe

(10) Patent No.: US 7,366,835 B2
(45) Date of Patent: Apr. 29, 2008

(54) DATA ACCESS RESPONDING SYSTEM, STORAGE SYSTEM, CLIENT APPARATUS, CACHE APPARATUS, AND METHOD FOR ACCESSING DATA ACCESS RESPONDING SYSTEM

(75) Inventor: Kazuichi Oe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 308 days.

(21) Appl. No.: 11/114,227

(22) Filed: Apr. 26, 2005

(65) Prior Publication Data
US 2006/0041614 A1 Feb. 23, 2006

Related U.S. Application Data

(63) Continuation of application No. PCT/JP03/06354, filed on May 21, 2003.

(51) Int. Cl.
*G06F 12/00* (2006.01)
(52) U.S. Cl. ............ 711/113; 711/100; 711/118; 711/154
(58) Field of Classification Search .............. None
See application file for complete search history.

(56) References Cited

U.S. PATENT DOCUMENTS 6,374,289 B2 * 4/2002 Delaney et al. ............ 709/203
6,952,712 B2 * 10/2005 Yoshimura et al. ......... 709/201
7,051,121 B2 * 5/2006 Ohno et al. .................. 710/5

FOREIGN PATENT DOCUMENTS

JP 2003-6137 1/2003

OTHER PUBLICATIONS

Kostas Magoutis, The Optimistic Direct Access File System: Design and Network Interface Support, 8th IEEE Int'l Symposium on High-Performance Computer Architecture, Feb. 2002, Retrieved from Internet: <http://www.csl.cornell.edu/SAN-1/>.
The Direct Access File System (DAFS) Protocol Specification, Network Appliance, Inc., 2001, retrieved from the Internet:<URL:http://www.defscollaborative.org/tools/spec.shtml>.
"Special Plan, technology description for DAFS", Mar. 2003, http://www/dafs01.html.

* cited by examiner

*Primary Examiner*—Jasmine Song
(74) *Attorney, Agent, or Firm*—Westerman, Hattori, Daniels & Adrian, LLP.

(57) ABSTRACT

A control apparatus provides a transfer instruction to one of storage apparatus and a cache apparatus, in which relevant data is stored, when receiving an access request from a client apparatus for the data for which the storage location is managed; and the one of the storage apparatus and the cache apparatus receiving the transfer instruction directly returns a reply message, to the client apparatus, having information of the storage location of the data added thereto, which data the access request requests.

7 Claims, 25 Drawing Sheets

DATA ACCESS RESPONDING SYSTEM, STORAGE SYSTEM, CLIENT APPARATUS, CACHE APPARATUS, AND METHOD FOR ACCESSING DATA ACCESS RESPONDING SYSTEM

CROSS-REFERENCE TO RELATED APPLICATION

This application is a U.S. continuation application filed under 35 USC 111(a) claiming benefit under 35 USC 120 and 365(c) of PCT application JP03/06354, filed May 21, 2003. The foregoing application is hereby incorporated herein by reference.

BACKGROUND OF THE INVENTION

1. Field of the Invention

The present invention relates to, in particular, an art of accessing a storage apparatus such as a hard disk apparatus or such from a client apparatus such as a personal computer (simply referred to as a 'PC' hereinafter) or a work station (simply referred to as a 'WS', hereinafter).

2. Description of the Related Art

A so-called storage system has been applied for a wide variety of fields, in which, for example, a storage apparatus such as a hard disk apparatus is physically connected to a client apparatus such as a PC, a WS or such, via an interface such as an SCSI (small computer system interface), an FC (fiber channel) or such.

FIG. 25 shows one example of such a storage system in the related art.

The storage system shown in FIG. 25 includes a client apparatus 100 such as a PC, a bus 300 connected to an SCSI card 103, and an input/output apparatus 200 having a disk apparatus 203 or such. The client apparatus 100 and the input/output apparatus 200 are connected via the bus 300. The client apparatus 100 includes a CPU 101, a main memory 102, the SCSI card 103 and an internal bus 104. The CPU 101 and the main memory 102 are connected via the internal bus 104 in such a manner that they can communicate with one another therewith. The internal bus 104 is connected to the SCSI bus 103. Further, the main memory 102 has a file system 105 and an SCSI driver 106 incorporated therein for providing functions of an OS (operating system).

The input/output apparatus 200 includes a disk controller 201, a buffer 202 and the disk apparatus 203. The disk apparatus 203 is connected with the disk controller 201 via the buffer 202, and the disk controller 201 is connected with the bus 300.

In the storage system, when data is written in the input/output apparatus 200 by the client apparatus 100, for example, the following processing is carried out.

That is, the OS (file system 105) of the client apparatus 100 makes writing request to the SCSI driver 106 for the disk apparatus 203 (A1). The SCSI driver 106 repeats negotiation for determining a data transfer rate with the disk controller 201 several times, and then, set a path on the bus 300 (A2). After the path is thus set, the client apparatus 100 requests the disk controller 201 for data writing so as to first start data transfer (A3). In this case, when a time is required for data writing in the input/output apparatus 200, the SCSI driver 106 once cancels the path with the disk controller 201.

The disk controller 201 of the input/output apparatus 200 stores data received from the client apparatus 100 in the buffer 202 temporarily (A4), and then, writes the received data in the disk apparatus 203 (A5). When the data writing in the input/output apparatus 200 is finished, the disk controller 201 reports this writing finish to the SCSI driver 106 with an interrupt (A8). The SCSI 106 reports the transfer completion to the file system 105 (A9).

In the storage system in the related art, when the client 100 makes data transfer to the input/output apparatus 200, the disk controller 201 should be first started up according to a protocol prescribed in the SCSI, FC or such in the input/output apparatus 200. Further, until data transfer is actually commenced by the client apparatus 100 to the input/output apparatus 200, a plurality of times of negotiation should be made for the purpose of determining the transfer rate as mentioned above. Accordingly, a latency (waiting time) required for actually starting the data transfer may be long, and also, a procedure carried out after the commencement of the data transfer may be complicated.

Further, the data transfer rate with the use of the interface such as the SCSI, FC or such is at most 160 Mbytes/sec. Therefore, development should be proceeded for a higher speed input/output technology for a next generation. Otherwise, a high speed transmission band such as 2.5 Gbps, 10 Gbps, 30 Gbps or such of an InfiniBand (a trademark of InfiniBand (SM) Trade Association, abbreviated as an 'IB', hereinafter) or such for example, may not be effectively utilized.

For example, Japanese Laid-open Patent Application No. 2003-6137 (in particular, paragraphs 0010 through 0020, FIG. 1 or such) discloses a storage system for solving the problem. This storage system includes a client apparatus, an input/output apparatus, a connecting part connecting therebetween, a virtual address managing part managing virtual address information and physical address information of the input/output apparatus in such a manner that relationship therebetween is provided, and a control part controlling data transfer between the client apparatus and the input/output apparatus based on the virtual address information managed by the managing part. Thereby, the complicated negotiation required for the commencement of data transfer from the client apparatus to the input/output apparatus can be omitted.

On the other hand, a development of a system enabling dividing processing for dividing a given processing load among a plurality of servers has been proceeded actively for solving a problem that a large amount of data should be processed at a high speed. However, for achieving this object, a high speed file access technology is required in which a plurality of servers can access a common data resource, and also, an arbitrary server can access an arbitrary data resource. For this purpose, a development of a file sharing protocol called a direct access file system (abbreviated as 'DAFS' hereinafter) has been promoted which conforms to the transmission band of the above-mentioned IB for example. The DAFS is achieved with the use of remote direct memory access (abbreviated as an 'RDMA' hereinafter) technology or such in which a memory of a different client apparatus may be directly accessed (see a Web site, http://www/dafs01.html ("special plan, technology description for 'DAFS'", Mar. 17, 2003).

SUMMARY OF THE INVENTION

An object of the present invention is to provide a data access responding system, a storage system, a client apparatus, a cache apparatus and a method for accessing the data access responding system, in which, with the use of a protocol such as the DAFS, with sufficient and effective utilization of a high speed transmission band such as the IB, a data transfer latency required between a client apparatus and an storage apparatus can be effectively reduced.

According to a first aspect of the present invention, a data access responding system includes a storage apparatus storing data; a cache apparatus which acts as a cache for the data stored in the storage apparatus; a client apparatus processing the data, and a control apparatus managing storage locations of the data in the storage apparatus and in the cache apparatus, which are connected via a communication network, wherein the control apparatus provides a transfer instruction to one of the storage apparatus and the cache apparatus, in which one the relevant data is stored, when receiving an access request from the client apparatus for the data for which the storage location is managed; and the one of the storage apparatus and the cache apparatus thus receiving the transfer instruction directly returns a reply message to the client apparatus accompanied by information of the storage location of the relevant data.

It is noted that the storage system according to the present invention includes the above-mentioned elements except the client apparatus.

The control apparatus according to the first aspect of the present invention carries out management as to which data is stored in which location in the storage apparatus and also, in some case, in the cache apparatus, and also, unitarily receives an access request from the client for the data stored in the storage apparatus, and also, in some case, in the cache apparatus, in principle. When the data for which access request is made by the client apparatus is stored in only one apparatus of the storage apparatus and the cache apparatus, the control apparatus provides a data transfer instruction to this one apparatus. It is noted that, in an ordinary condition, according to the inherent function of the cache apparatus, there is no case where some data is only stored in the cache apparatus not in the storage apparatus. When the relevant data is stored in both the storage apparatus and the cache apparatus, the control apparatus provides a data transfer instruction to the cache apparatus. According to the first aspect of the present invention, a destination to which the control apparatus provides the data transfer instruction when receiving an access request from the client apparatus is referred to as a 'storage destination apparatus'. The client apparatus can obtain the relevant data by carrying out, for example, RDMA processing of directly accessing the storage destination apparatus. Thereby, it is possible to effectively shorten the latency required along with the client apparatus making an access request.

It is possible to further shorten the latency required along with the client apparatus making an access request, by providing a memory in which information of the data storage location at which the relevant data is stored in the storage destination apparatus is stored, and, directly accessing the storage destination apparatus with the use of the information and having the data transferred thereto without making an access request to the control apparatus, when making an access request for the data for which the information is thus stored in the above-mentioned memory in a cache manner. Further, when an access frequency of accessing the data for which the information is stored in the client apparatus lowers, this information may be erased so that the memory of the client apparatus can be effectively utilized.

Further, the above-mentioned manner for making an access request may be applied not only for data transfer but also for data writing, in the same way. When writing is carried out in the cache apparatus, the same data is copied in the storage apparatus for the purpose of storage data consistency between the storage apparatus and the cache apparatus.

According to a second aspect of the present invention, a data access responding system includes a storage apparatus storing data; a cache apparatus which acts as a cache for the data stored in said storage apparatus; a client apparatus processing the data, and a control apparatus managing a storage location of data in said storage apparatus or said cache apparatus, which communicate each other via a communication network, wherein, the client apparatus has a memory having a cache area storing data, and notifies the control apparatus of information concerning the cache area.

In the control apparatus according to the second aspect of the present invention, it is possible to directly access the cache apparatus and carry out RDMA process, by storing information of the storage location of the data in the cache area, for which data an access frequency to the cache apparatus is high. Accordingly, it is possible to shorten the latency required along with access request made by the client apparatus.

Further, the control apparatus may manage an access frequency to the data stored in the cache apparatus, and may delete the information of the storage location for the data for which the access frequency lowers, at any time. Thereby, it is possible to effectively utilize the cache area of the client apparatus. It is noted that, management of the access frequency may be made by client apparatus, and the client apparatus may request the control apparatus for the information of the storage area of the data when determining the data has a high access frequency.

Further, the client apparatus according to the second aspect of the present invention can search for the information of the storage location from the cache area when making an access request for the data for which the storage area is managed by the control apparatus, and, can directly access the cache apparatus so as to have the relevant data transferred thereto without making an access request to the control apparatus when determining that the relevant data is stored in the cache apparatus from the information stored in the cache area. Further, when the access request is accompanied by writing processing, it is possible to achieve storage data consistency as in the above-described first aspect of the present invention by copying the data once written in the cache apparatus also to the storage apparatus.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENTS

Embodiments of a data access responding system, a storage system, a client apparatus, a cache apparatus and a method of accessing the data access responding system according to the present invention are described below.

Figure 1:
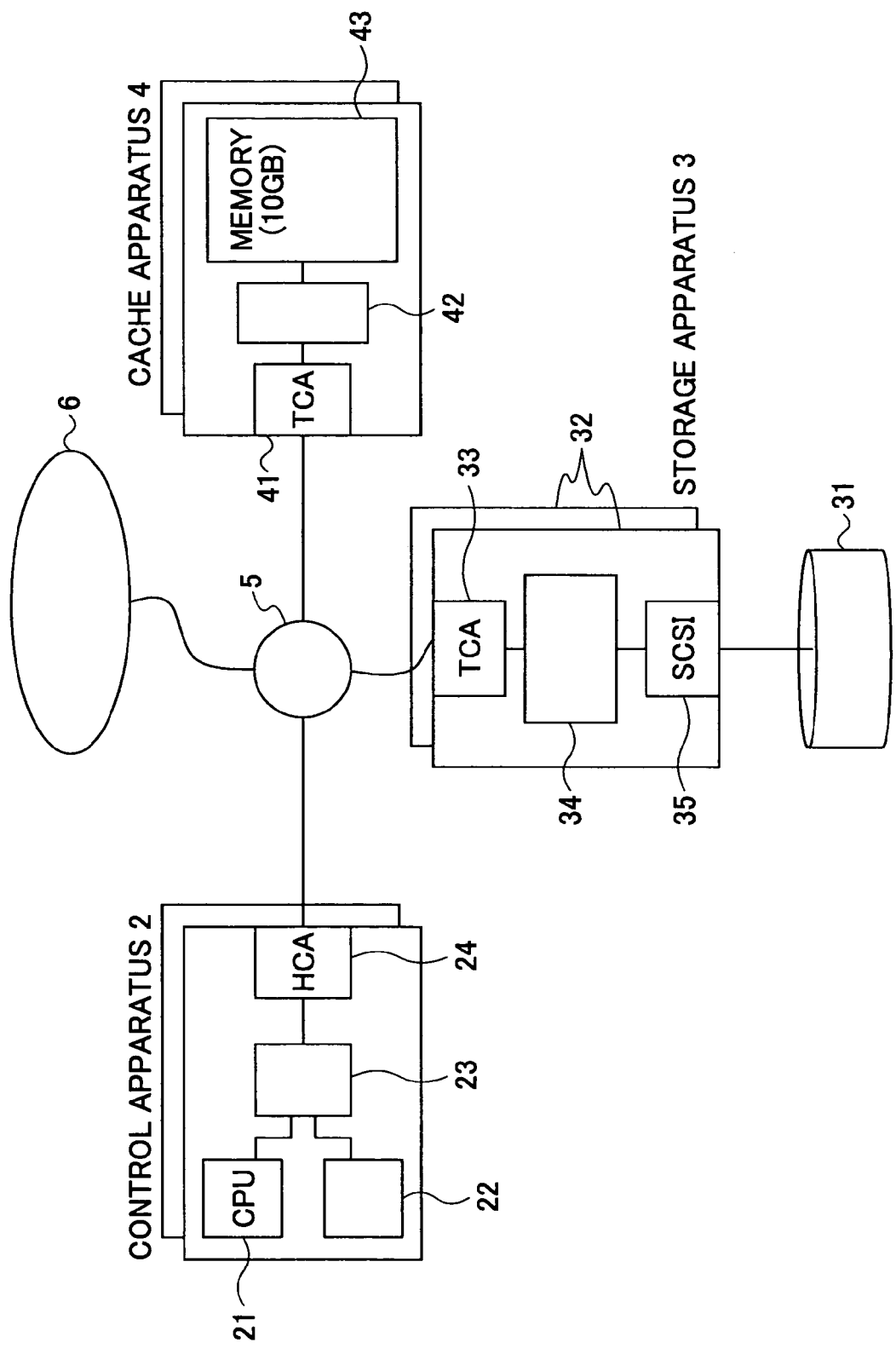
FIG. 1 shows a configuration of a data access responding system according to a first embodiment of the present invention.

FIG. 1 shows a configuration of a data access responding system according to a first embodiment of the present invention.

The data access responding system according to the first embodiment includes a client apparatus 6 group including a plurality of client apparatus 7 which are PCs or WSs connected via a communication network 5; a storage apparatus 3 connected with the client apparatus group 6 via the communication network 5; a cache apparatus 4 acting as a cache of data stored in the storage apparatus 3; and a control apparatus 2 which is a WS managing storage locations of data stored in the storage apparatus 3 and in the cache apparatus 4.

Each of the respective client apparatuses 7 of the client apparatus group 6, the storage apparatus 3, the cache apparatus 4 and the control apparatus 2 has a communication function, and, therewith, each client apparatus 7, the storage apparatus 3, the cache apparatus 4 and the control apparatus 2 can mutually communicate via the communication network 5. The storage apparatus 3, the cache apparatus 4 and the control apparatus 2 are included in a storage system according to the first embodiment of the present invention.

The cache apparatus 4 has a semiconductor memory requiring a short access time for storing therein data for which an access frequency is high, ordinarily copied from among data stored in the storage apparatus 3.

The control apparatus 2 carries out management as to which data is stored in which location in the storage apparatus 3 and in the cache apparatus 4, and also, unitarily accepts an access request received from the client apparatus 7 for data stored in the storage apparatus 3 or, in some case, also in the cache apparatus 4, in principle. Then, when the relevant data is stored only in one of the storage apparatus 3 and the cache apparatus 4, the control apparatus 2 requests the relevant one thereof to transfer the relevant data. On the other hand, when the relevant data is stored in both of the storage apparatus 3 and the cache apparatus 4, the control apparatus 2 requests the cache apparatus 3 to transfer the relevant data. As mentioned above, in an ordinary condition, there is no case where some data is stored only in the cache apparatus 4 since the data stored in the cache apparatus 4 is a copy of the same stored in the storage apparatus 3 in the ordinary condition.

According to the first embodiment of the present invention, such a destination which the control apparatus 2 thus requests for a transfer of relevant data in response to an access request received from the client apparatus 7, is referred to as a 'storage destination apparatus', hereinafter.

The storage destination apparatus thus receives such a data transfer instruction, for example, the cache apparatus 4, allows the client apparatus 7 to directly access thereto in the RDMA manner according to the transfer instruction.

The communication network 5 employs, for example, optical fibers, and, it is possible to achieve therewith data communication at 10 Gbps. Accordingly, it is possible to apply it for the IB. However, the available data communication rate of the network 5 should not be necessarily 10 Gbps. The same may be 2.5 Gbps, 30 Gbps, or such instead.

The client apparatus group 6 have a configuration in which the plurality of client apparatuses 7 are connected to a Local Area Network (abbreviated as 'LAN' hereinafter) employing optical fibers for example. However, instead, the LAN may employ coaxial cables.

The storage apparatus 3 includes a disk apparatus 31 for storing data, and interface cards 32 controlling external access to the disk apparatus 31. Each interface card 32 includes a target channel adapter (TCA) 33 functioning as a network controller, a conversion and management part 34 carrying out protocol conversion processing and disk area management processing, and an SCSI 35 having a function of a disk controller. The conversion and management part 34 interprets a message received from the control apparatus 2, and, according to the contents of the message, an access from the client apparatus 7 to the disk apparatus 31 is allowed via the SCSI 35 as a normal way, or a direct access to data stored in the disk apparatus 31 in the RDMA manner is allowed.

The cache apparatus 4 includes a memory device 43 employing the semiconductor memory such as a RAM having a storage capacity of 10 Giga-bytes for example, a target channel adapter (TCA) 41 having a function of a network controller, and a memory management part 42 carrying out protocol processing and memory area management.

The memory management part 42 carries out management as to which area of the memory device 43 is allocated as a cache for data of the disk apparatus 31, as well as interprets a message from the control apparatus 2. Then, according to the message contents, the memory management part 42 allows the client apparatus 7 to directly access the memory device 43 so that the relevant data is transferred to the client apparatus 7. Further, at this time, the cache apparatus 4 returns a predetermined reply message to the client apparatus 7.

The control apparatus 2 has a CPU 21, a memory 22, a chip set 23 and a host channel adapter (HCA) 24, and a program managing the data access responding system is mounted therein in a form of software, firmware or such. In this program, a handler executing protocol processing according to DAFS is incorporated.

According to instructions written in the program, the control apparatus 2 accepts an access request received from the client apparatus 7, and carries out management as to which data is stored in which area in the storage apparatus 3 or in the cache apparatus 4.

Figure 2:
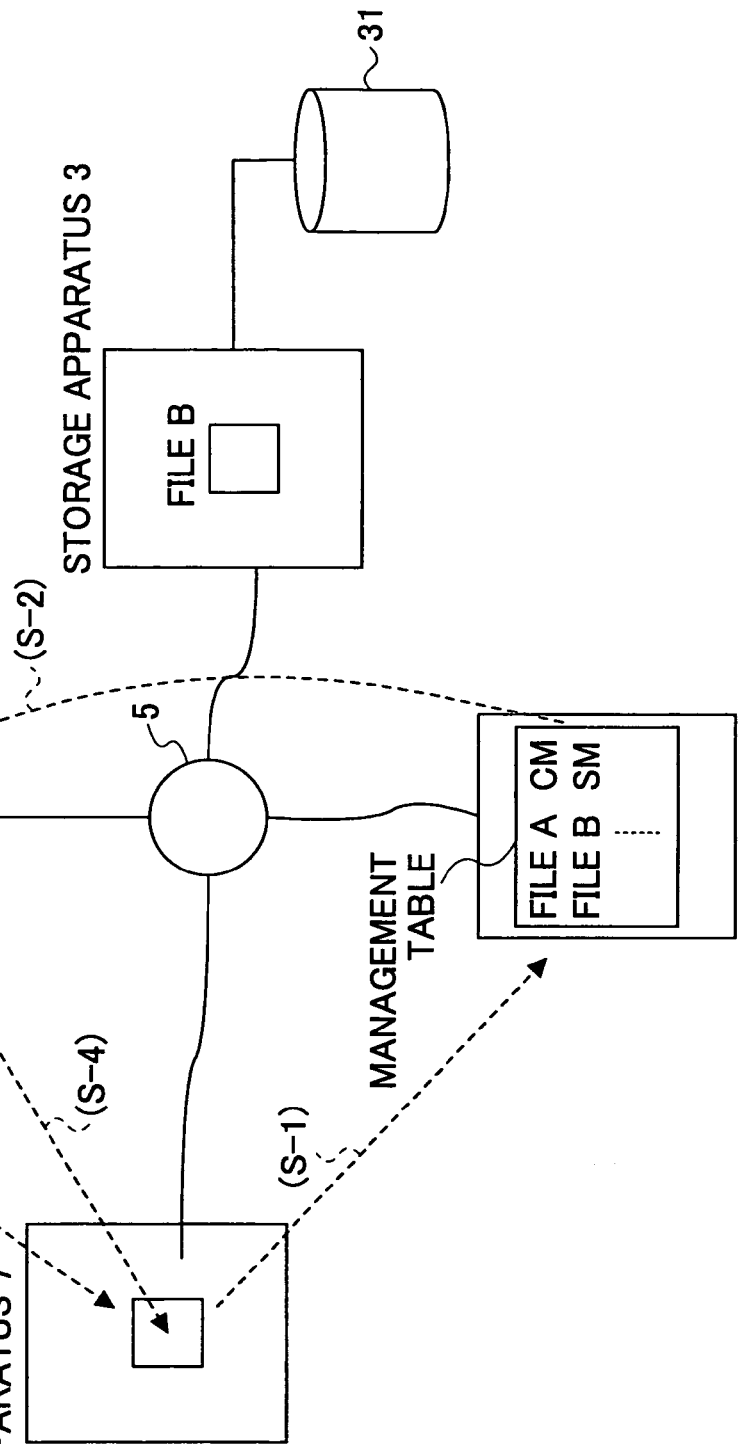
FIG. 2 shows processing of the data access responding system receiving an access request from a client apparatus.

FIG. 2 shows processing carried out in the data access responding system described above when receiving an access request from the client apparatus 7.

The data access responding system shown in FIG. 2 includes, as described above, the client apparatuses 7, and the storage system, including the storage apparatus 3, the cache apparatus 4 and the control apparatus 2, connected to the respective ones of the client apparatuses 7. The client apparatuses 7, the storage apparatus 3, the cache apparatus 4 and the control apparatus 2 can mutually communicate via the respective communication functions, as mentioned above. For the purpose of simplification, description is made for relationship with only one of the client apparatuses 7 hereinafter as shown. The same manner is also applied with reference to other figures described later.

For example, the cache apparatus 4 has a file A stored therein, and the storage apparatus 3 has a file B stored therein. The control apparatus 2 has a management table in which storage locations at which the respective files are stored in the storage apparatus 3 and, for some case, in the cache apparatus 4, are recorded.

When an access request for the file A is made from the client apparatus 7 to the control apparatus 2 based on the DAFS protocol (Step S-1, shown in FIG. 2), the control apparatus 2 interprets the contents of the access request. When recognizing that the access request is made for the file A as a result of the interpretation, the control apparatus 2 searches the management table, and finally recognizes that the file A concerning the access request is stored in the cache apparatus 4.

After recognizing that the file A is stored in the cache apparatus 4, the control apparatus 2 sends a data transfer instruction according to the DAFS protocol to the cache apparatus 4 (Step S-2). At this time, the client apparatus 7 can be identified with the use of an IP (internet protocol) address or such, for example.

When receiving the data transfer instruction from the control apparatus 2, the cache apparatus 4 interprets the contents thereof, and finally recognizes that an instruction having been given to transfer data to the client apparatus 7. The cache apparatus 4 then reads the file A concerning the data transfer instruction from the memory device 43, and sends a reply message, once received from the control apparatus 2, to the client apparatus 7 (Step S-3). Further, the cache apparatus 4 allows the client apparatus 7 to directly access in the RDMA manner to the file A thus read out (Step S-4).

On the other hand, when the file B is requested by the client apparatus 7, and the control apparatus 2 recognizes that the relevant file B is not stored in the cache apparatus 4 as a result of searching the management table, the control apparatus 2 further searches the management table and finally recognizes that the file B is stored only in the storage apparatus 3. When the storage apparatus 3 is thus determined as a place storing the file B, and the control apparatus 2 sends a data transfer instruction based on the DAFS protocol to the storage apparatus 3 which is the storage destination apparatus. The storage apparatus 3 receiving the transfer instruction reads the file B, and sends a reply message, once received from the control apparatus 2, to the client apparatus 7. Also, the storage apparatus 3 allows the client apparatus 7 to directly access in the RDMA manner to the file B thus read.

Thus, the data access responding system according to the first embodiment of the present invention has the cache apparatus in which some of data which the client apparatus 7 intends to access is stored in the semiconductor memory merely requiring a short access time in a cache manner. Further, each apparatus included in the data access responding system are connected mutually by the communication network enabling high speed data communication, and also, can carry out processing based on the DAFS protocol adapted to high speed data transfer in the RDMA manner. Accordingly, it is possible to shorten the latency required along with an access request is made by the client apparatus for predetermined data.

Further, in the data access responding system according to the first embodiment of the present invention, some of or all of the client apparatuses have memories having storage capacities for storing storage location information for data stored in the cache apparatus, and are configured to utilize the storage location information so as to further shorten the latency required along with making an access request. A specific scheme to this utilization of the storage location information is described next.

Figure 3:
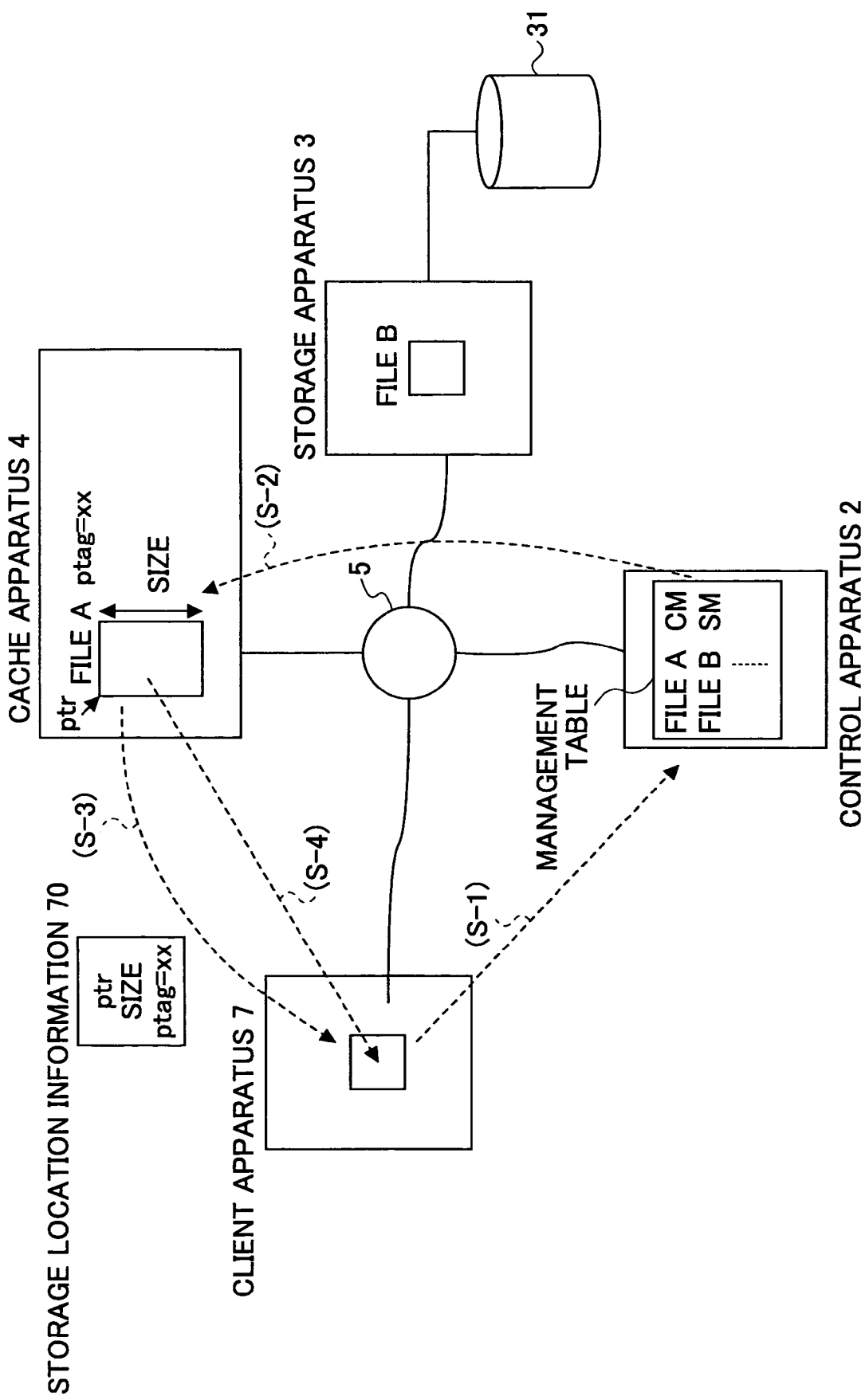
FIGS. 3 and 4 show processing of the data access responding system receiving an access request from a client apparatus which has a memory storing storage location information.
Figure 4:
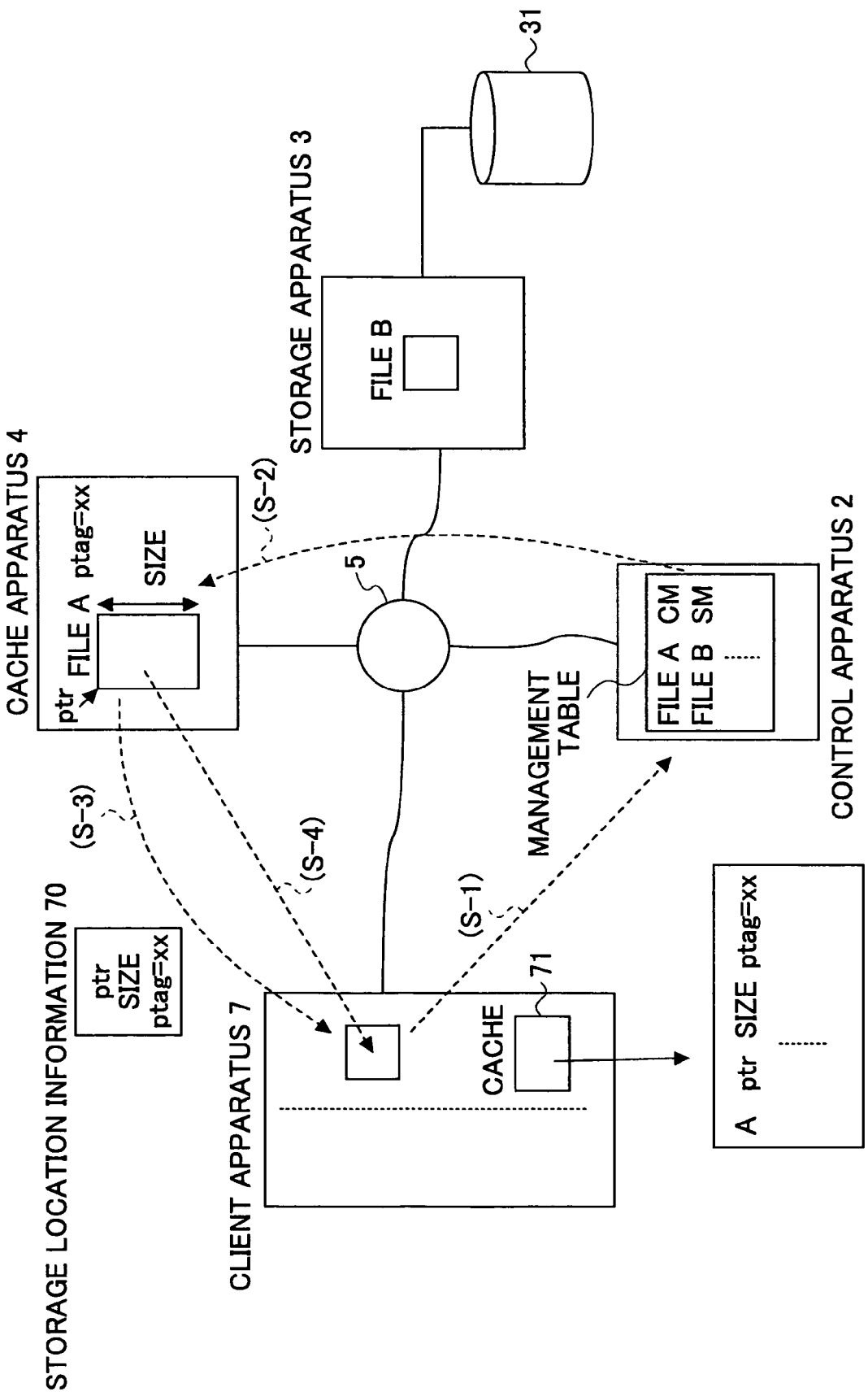
Figure 5:
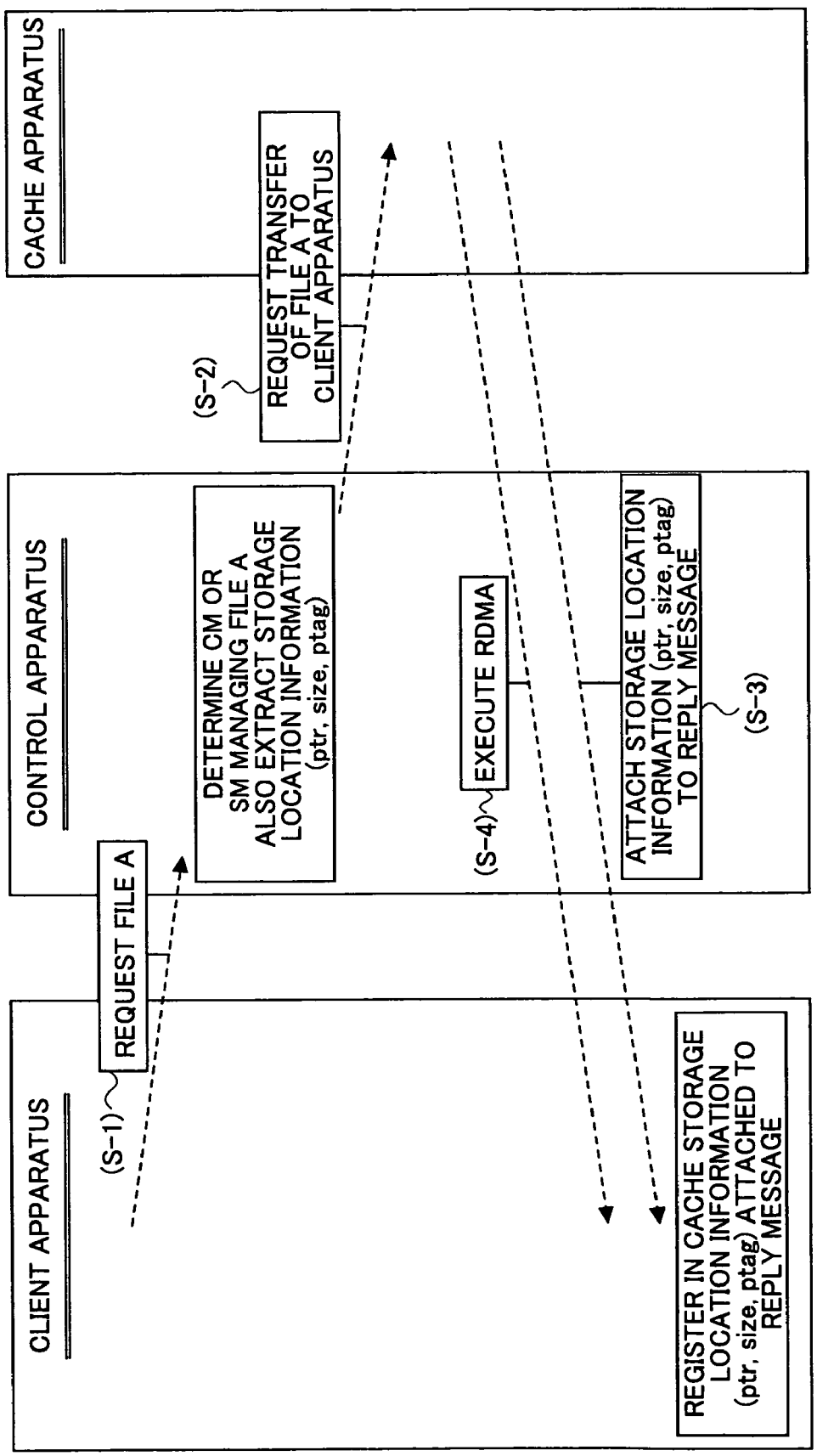
FIG. 5 shows a sequence chart of the data access responding system when receiving an access request from the client apparatus.

FIGS. 3 and 4 shows processing of the data access responding system receiving an access request from the client apparatus which has a memory for storing the storage location information. FIG. 5 shows a sequence chart of the same processing.

The data access responding system according to the first embodiment shown in FIGS. 3 and 4 includes the client apparatus 7 having a cache memory 71, and the storage system, including the storage apparatus 3, the cache apparatus 4 and the control apparatus 2, connected to the client apparatus 7 via the communication network 5.

The client apparatus 7, the storage apparatus 3, the cache apparatus 4 and the control apparatus 2 can communicate mutually via the communication network 5, by their communication functions.

In the cache apparatus 4, a file A is stored. The file A has a pointer 'ptr' indicating the data storage location in the memory device 43; information of 'size' indicating the data size; and a protection tag 'ptag' functioning to allow only a predetermined client apparatus to access thereto are set. Also, a file B is stored in the storage apparatus 3. The pointer 'ptr', the 'size' and the protection tag 'ptag' are collectively referred to as 'storage location information', hereinafter.

In the control apparatus 2, the management table is provided in which the storage destination apparatuses of respective files stored in the respective ones of the storage apparatus 3 and the cache apparatus 4 are recorded. Specifically, the cache apparatus (sometimes, referred to as 'CM') acts as the storage destination apparatus for the file A, while the storage apparatus (sometimes, referred to as 'SM') acts as the storage destination apparatus for the file B, in this example.

In the client apparatus 7, the cache memory 71 storing the storage location information (which also includes the file name 'A'; as well as the pointer 'ptr'; the file size 'size'; and the protection tag 'ptag=xx') of the file A stored in the cache apparatus 4 is provided.

As shown in FIGS. 3 through 5, when an access request is made to the control apparatus 2 from the client apparatus 7 having the cache memory 71 for the file A, based on the DAFS protocol (Step S-1), the control apparatus 2 interprets the contents of the access request, and recognizes the storage destination apparatus (the cache apparatus CM or the storage apparatus SM) in which the relevant file A is stored. After it is finally determined that the file A is stored in the cache apparatus CM from the management table, the control apparatus takes out the storage location information ('ptr', 'size' and 'ptag') for the file A from the management table. Next, the control apparatus 2 sends a transfer instruction for the file A, to be transferred to the client apparatus 7, to the cache apparatus 4 based on the DAFS protocol (Step S-2). At this time, identification of the client apparatus 7 can be achieved with the use of the IP (Internet) address or such, When receiving this transfer instruction for the file A from the control apparatus 2, the cache apparatus 4 interprets the contents thereof, and recognizes that this instruction indicates transfer of the file A to the client apparatus 7. The cache apparatus 4 then reads out the file A from the memory device 43, and sends a reply message to the client apparatus 7, to which message the above-mentioned storage location information 70 ('ptr', 'size' and 'ptag') for the file A received from the control apparatus 2 is attached (Step S-3). Then, the client apparatus 7 directly accesses the file A thus read out, in the RDMA manner, and has the file A transferred to the client apparatus 7 (Step S-4). The client apparatus 7 then stores, in the cache memory 71, the storage location information ('ptr', 'size' and 'ptag'), received from the cache apparatus 4 as mentioned above, for the file A as shown in FIG. 4.

Figure 6:
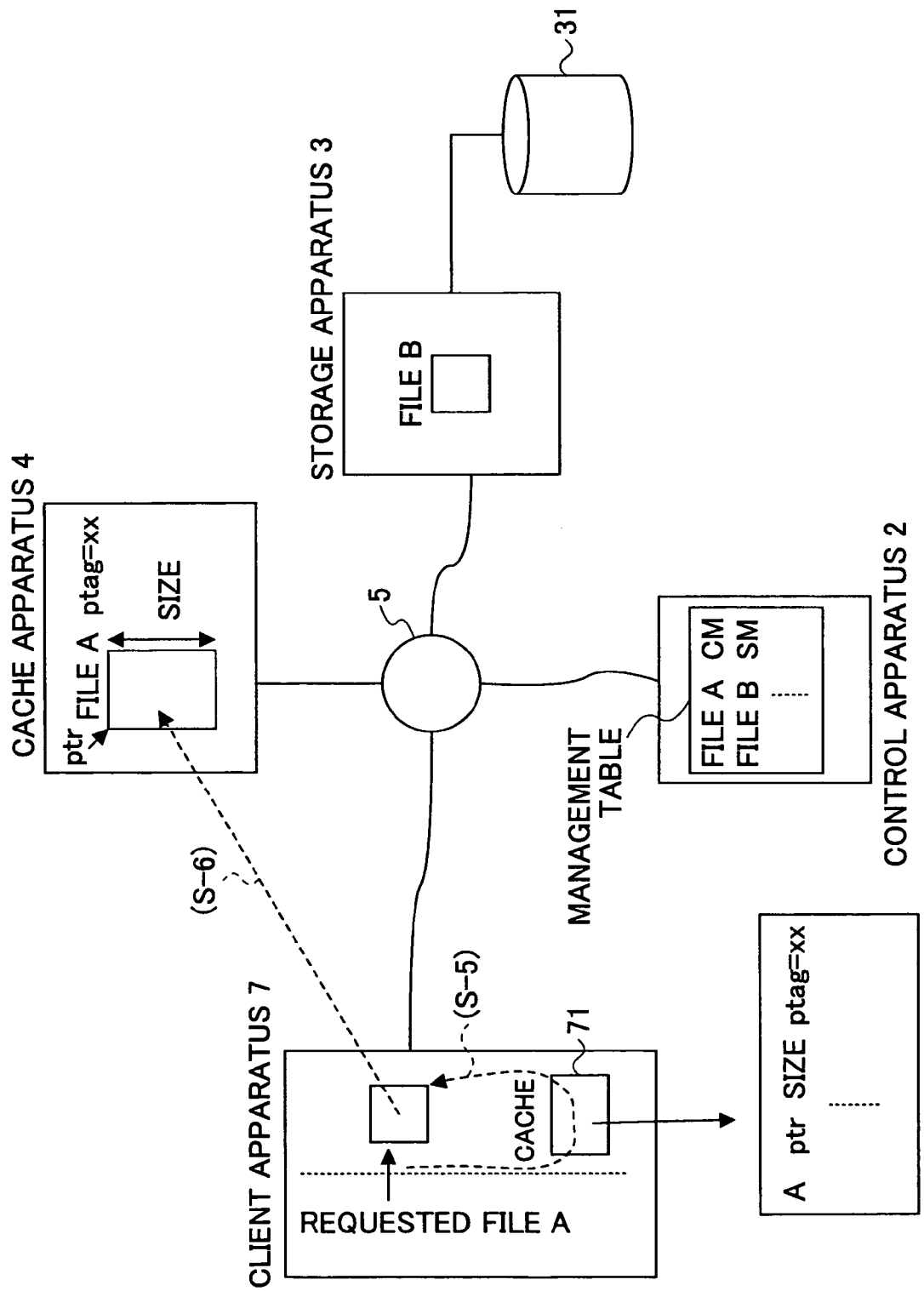
FIG. 6 shows processing of making an access request from the client apparatus having the storage location information for a file A again.
Figure 7:
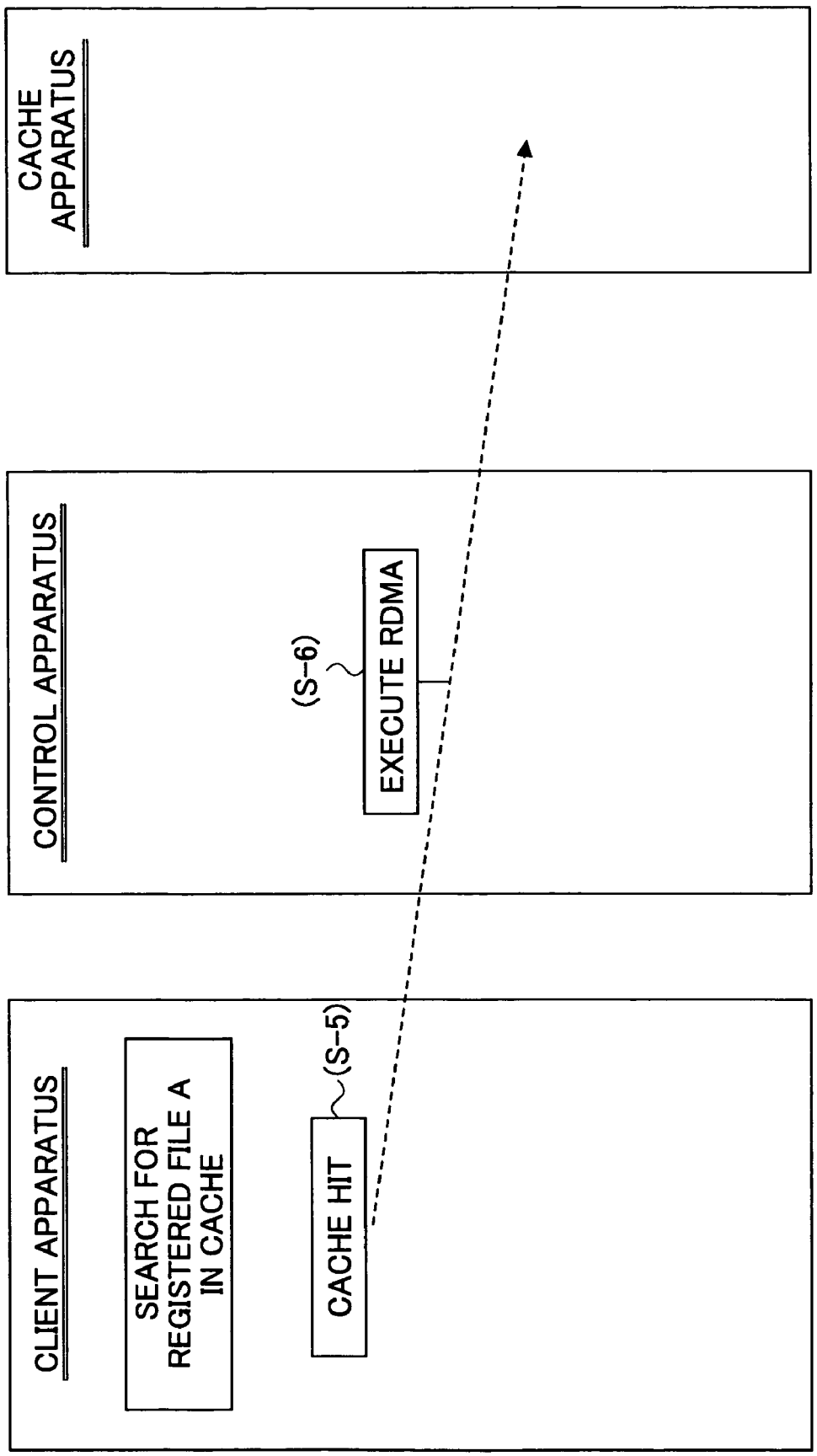
FIG. 7 shows a sequence chart for making an access request from the client apparatus having the storage location information for the file A again.

FIG. 6 shows processing of the client apparatus 7, which thus has the storage location information once stored in the cache memory 71, making an access request for the file A again, and FIG. 7 shows a sequence chart of the same processing.

The data access responding system according to the first embodiment shown in FIG. 6, the same as that shown in FIGS. 3 and 4 described above, includes the client apparatus 7 having the cache memory 71, and the storage system including the storage apparatus 3, the cache apparatus 4 and the control apparatus 2, connected to the client apparatus 7 via the communication network 5.

The client apparatus 7, the storage apparatus 3, the cache apparatus 4 and the control apparatus 2 can communicate mutually via the communication network 5, by their communication functions.

In the cache apparatus 4, the same as in FIGS. 3 and 4, the file A is stored. The file A has the pointer 'ptr' indicating the data storage location; the 'size' indicating the data size; and the protection tag 'ptag' for allowing only a predetermined client apparatus to access are set. Further, the file B is stored in the storage apparatus 3.

In the control apparatus 2, the same as in FIGS. 3 and 4, the management table is provided in which the storage destination apparatuses of respective files stored in the respective ones of the storage apparatus 3 and the cache apparatus 4, are recorded. Specifically, the cache apparatus CM acts as the storage destination apparatus for the file A, while the storage apparatus SM acts as the storage destination apparatus for the file B as mentioned above.

In the client apparatus 4, the same as in FIGS. 3 and 4, the cache memory 71 storing the storage location information (the file name 'A'; the pointer 'ptr'; the file size 'size'; the protection tag 'ptag=xx') of the file A stored in the cache apparatus 4 is provided. In this case, through the procedure described above with reference to FIGS. 3 through 5, the storage location information (the file name 'A'; the pointer 'ptr'; the file size 'size'; the protection tag 'ptag=xx') for the file A is actually stored in the cache memory 71 of the client apparatus 4.

In this case, as shown in FIGS. 6 and 7, when an access request is made from the client apparatus 7 having the relevant storage location information as mentioned above, the client apparatus 7 first searches the cache memory 71 for the storage location information for the file A concerning the current access request. Then, when recognizing that the storage location information for the file A is stored in the cache memory 71 (Step S-5), the client apparatus 7 directly accesses the cache apparatus 4 in the RDMA manner based on this storage location information for the file A without making an access request to the control apparatus 2 (Step S-6).

Thus, according to the first embodiment of the present invention, the storage location information for the data stored in the cache apparatus 4 is stored in the client apparatus 7, and, then, when a necessity arises to access the same data, the client apparatus 7 can directly access the cache apparatus 4 in the RDMA manner without making an access request to the control apparatus 2. Accordingly, it is possible to further shorten the latency required along with the access request.

Figure 8:
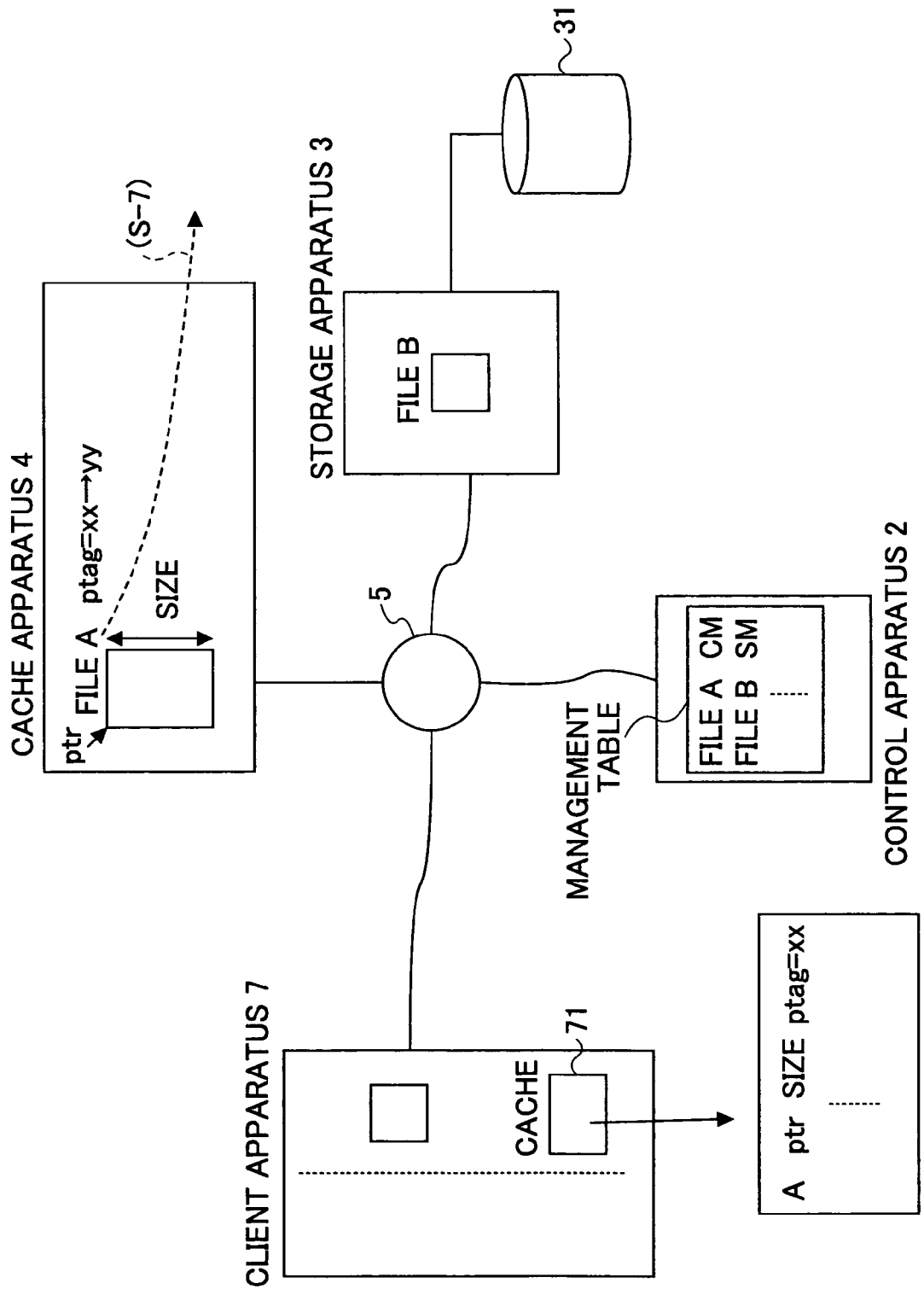
FIG. 8 shows one example of a way of avoiding direct access to the cache apparatus in an RDMA manner from the client apparatus.
Figure 9:
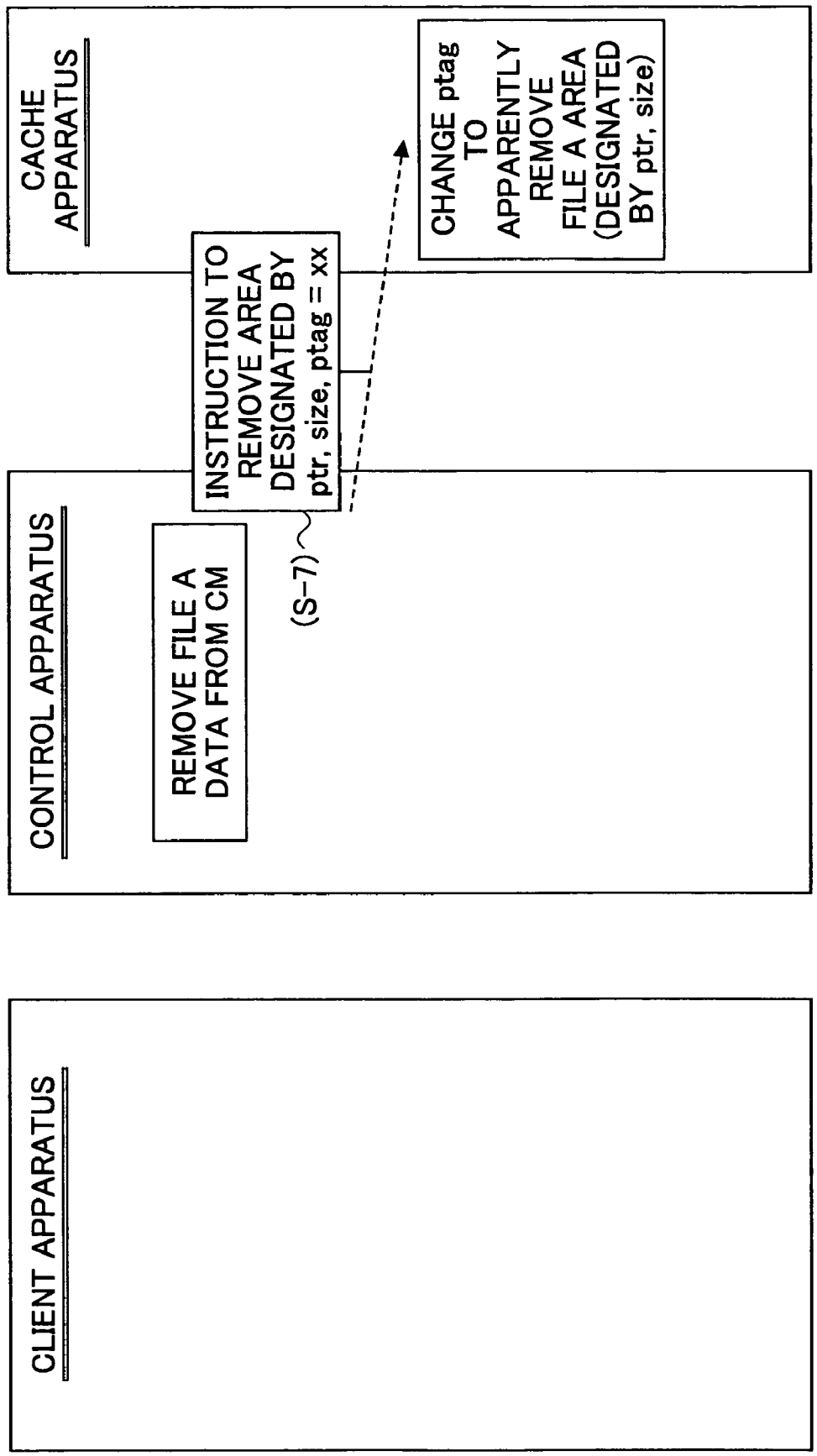
FIG. 9 shows a sequence chart for avoiding direct access to the cache apparatus in the RDMA manner from the client apparatus.

FIG. 8 shows one example of a way to avoid direct access to the cache apparatus 4 by the client apparatus 7 in the RDMA manner described above with reference to FIGS. 6 and 7. FIG. 9 shows a sequence chart of the same processing. Such processing is carried out, for example, for the purpose of finally delete the storage location information of the data stored in the cache apparatus 4, from the cache memory 71 of the client apparatus 7 for the data for which an access frequency to the cache apparatus 4 lowers.

The data access responding system according to the first embodiment shown in FIG. 8, the same as that shown in FIGS. 3 and 4 described above, includes the client apparatus 7 having the cache memory 71, and the storage system including the storage apparatus 3, the cache apparatus 4 and the control apparatus 2, connected to the client apparatus 7 via the communication network 5.

The client apparatus 7, the storage apparatus 3, the cache apparatus 4 and the control apparatus 2 can communicate mutually via the communication network 5, by their communication functions.

In the cache apparatus 4, the same as in FIGS. 3 and 4, the file A is stored. The file A has the pointer 'ptr' indicating the data storage location; the information 'size' indicating the data size; and the protection tag 'ptag' for providing a function of allowing only a predetermined client apparatus to access are set. Also, the file B is stored in the storage apparatus 3.

In the control apparatus 2, the same as in FIGS. 3 and 4, the management table is provided in which the storage destination apparatuses of respective files stored in the respective ones of the storage apparatus 3 and the cache apparatus 4 are recorded. Specifically, the cache apparatus CM acts as the storage destination apparatus for the file A, while the storage apparatus SM acts as the storage destination apparatus for the file B as mentioned above.

In the client apparatus 4, the same as in FIGS. 3 and 4, the cache memory 71 storing the storage location information (the file name 'A'; the pointer 'ptr'; the file size 'size'; the protection tag 'ptag=xx') of the file A stored in the cache apparatus 4 is provided. In this case, through the procedure described above with reference to FIGS. 3 through 5, the storage location information (the file name 'A'; the pointer 'ptr'; the file size 'size'; the protection tag 'ptag=xx') for the file A is actually stored in the cache memory 71 of the client apparatus 4.

In this case, as shown in FIGS. 8 and 9, in order to avoid direct access to the cache apparatus 4 by the specific client apparatus 7 for the file A in the RDMA manner, the control apparatus 2 sends an instruction to the cache apparatus 4 to remove the data of the file A, registered in the management table for the specific client apparatus 7, i.e., to apparently remove the memory area designated by the storage location information ('ptr', 'size' and 'ptag') in the memory device therefrom for the specific client apparatus 7 (Step S-7).

The cache apparatus 4 receiving this removal instruction changes the protection tag 'ptag' for the relevant memory area (storing the file A) provided for the specific client apparatus 7, from 'ptag=xx' into 'ptag=yy', for example, which may be a protection tag for another client apparatus. As a result, the file A identified by the storage location information ('ptr', 'size' and 'ptag=xx') is apparently removed from the cache apparatus 4 for the specific client apparatus 7. However, substantial data of the file A itself is not actually deleted from the cache apparatus 4, but only the protection tag is replaced from that for the specific client apparatus 7 into one for the other client apparatus as mentioned above so that the file A cannot be recognized by the specific client apparatus 7 in the cache apparatus 4.

Figure 10:
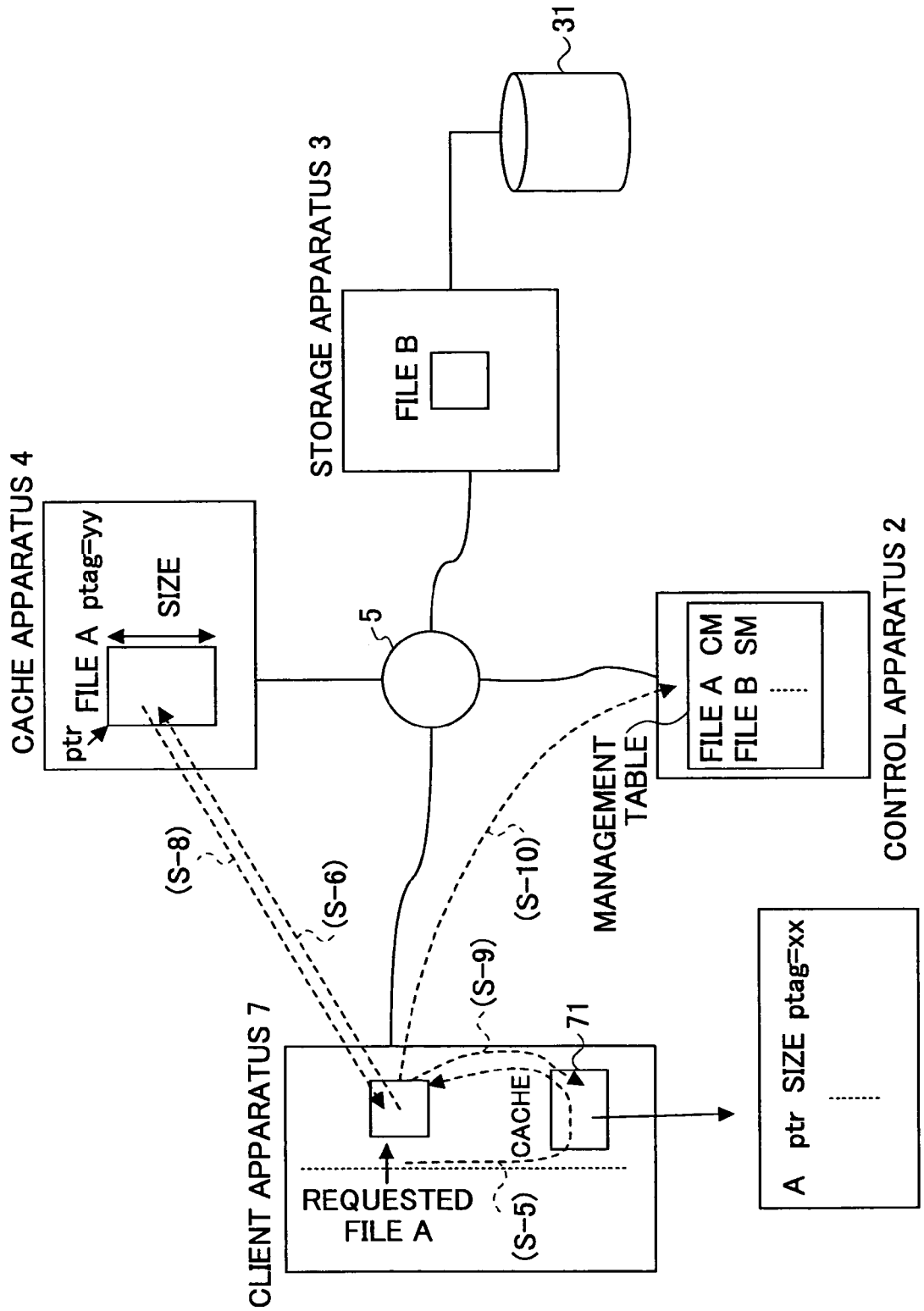
FIG. 10 shows processing carried out when, in a case where the cache apparatus removes information of storage location for a specific client apparatus, an access request for the same storage location arises again.
Figure 11:
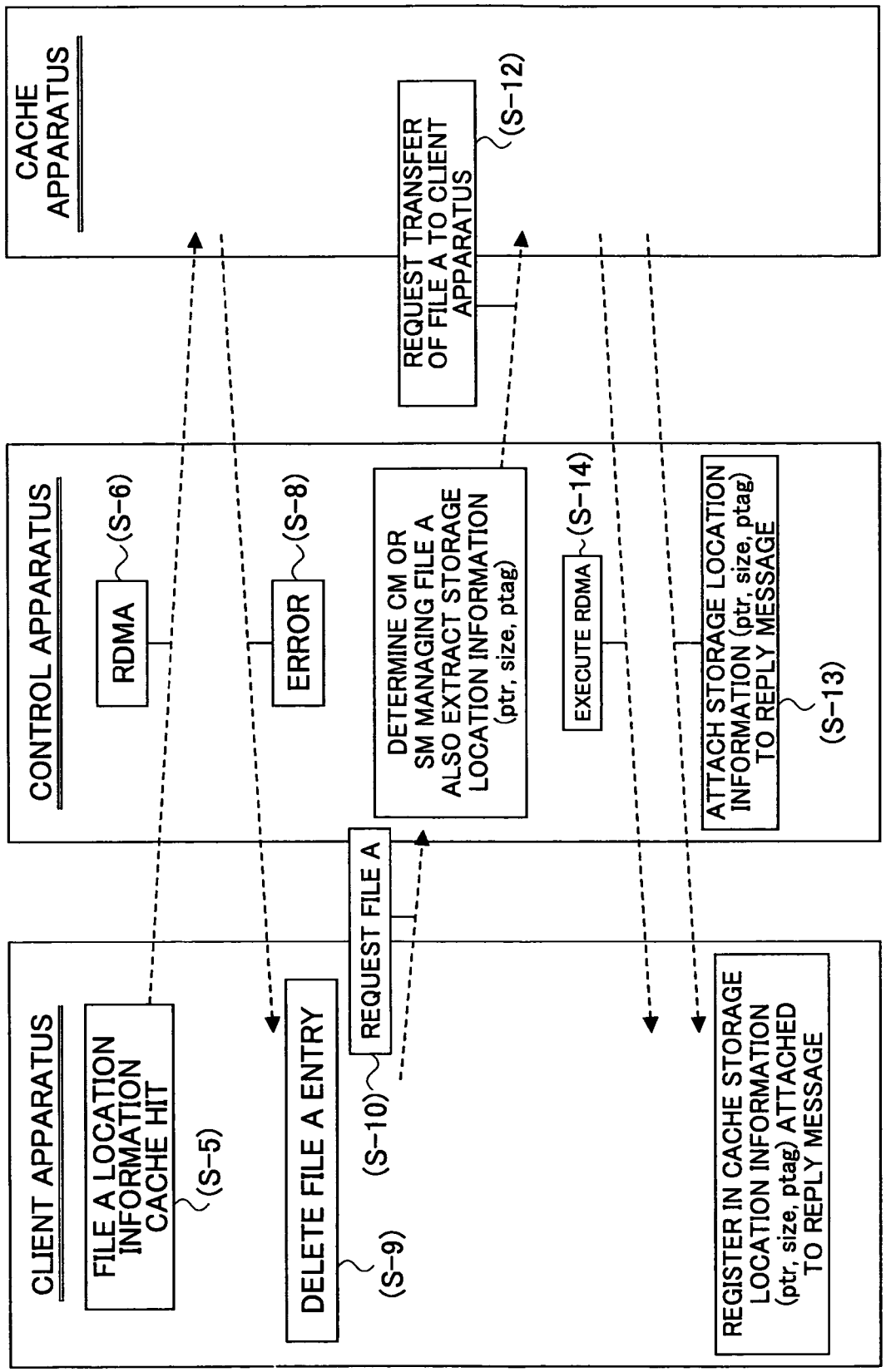
FIG. 11 shows a sequence chart of processing carried out when, in the case where the cache apparatus removes information of storage location for the specific client apparatus, the access request for the same storage location arises again.

FIG. 10 shows processing carried out when an access request for the relevant storage location is made after the information for the storage location for the specific client apparatus has been thus apparently removed from the cache apparatus 4. FIG. 11 shows a sequence chart of the same processing.

The data access responding system according to the first embodiment shown in FIG. 10, the same as that shown in FIG. 8 described above, includes the client apparatus 7 having the cache memory 71 and, the storage system including the storage apparatus 3, the cache apparatus 4 and the control apparatus 2, connected to the client apparatus 7 via the communication network 5.

The client apparatus 7, the storage apparatus 3, the cache apparatus 4 and the control apparatus 2 can communicate mutually via the communication network 5, by their communication functions.

In the cache apparatus 4 in this case of FIG. 10, the same as in FIG. 8, the file A is stored. The file A has the pointer 'ptr' indicating the data storage location; the information 'size' indicating the data size; and the protection tag 'ptag', which is replace as mentioned above so as not to allow the predetermined specific client apparatus 7 to directly access in Step S-7, are set.

In the control apparatus 2, the same as in FIG. 8, the management table is provided in which the storage destination apparatuses of respective files stored in the respective ones of the storage apparatus 3 and the cache apparatus 4, and so forth are recorded. Specifically, the cache apparatus CM acts as the storage destination apparatus for the file A, while the storage apparatus SM acts as the storage destination apparatus for the file B as mentioned above.

In the client apparatus 4, the same as in FIG. 8, the cache memory 71 storing the storage location information (the file name 'A'; the pointer 'ptr'; the file size 'size'; the protection tag 'ptag=xx') of the file A stored in the cache apparatus 4 is provided. In this case, the same as FIG. 8, in the cache memory 71 of the client apparatus 4, the storage location information (the file name 'A'; the pointer 'ptr'; the file size 'size'; the protection tag 'ptag=xx') for the file A is actually stored.

As shown in FIGS. 10 and 11, when an access request is made from the client apparatus 7 having the relevant storage location information already stored therein as mentioned above, the same as in the case of FIGS. 6 and 7, the client apparatus 7 first searches the cache memory 71 for the storage location information for the file A concerning the current access request. Then, when recognizing that the storage location information for the file A is stored in the cache memory 71 (Step S-5), the client apparatus 7 directly accesses the cache apparatus 4 in the RDMA manner based on this storage location information for the file A without making an access request to the control apparatus 2 (Step S-6).

However, in this case, the protection tag ptag in the cache apparatus 4 is replaced by 'ptag=yy' from the original one, i.e., 'ptag=xx' as mentioned above in the procedure of FIGS. 8 and 9 (Step S-7). Accordingly, the file A, designated by the original storage location information (the file name 'A', the pointer 'ptr', the file size 'size' and the protection tag 'ptag=xx') cannot be found out from the cache apparatus 4. As a result, the cache apparatus 4 notifies the client apparatus 7 that the relevant request results in an error (Step S-8). Based on this error notification from the cache apparatus 4, the client apparatus 7 deletes the storage location information for the file A from the cache memory 71 (Step S-9) by determining that the relevant storage location information is no more valid.

Then, when the client apparatus 7 makes an access request for the file A again, since the storage location information for the file A has been thus deleted, the client apparatus 7 then makes an access request to the control apparatus 2 as in the case of FIGS. 3 through 5. When the access request is made to the control apparatus 2 from the client apparatus 7 for the file A based on the DAFS protocol (Step S-10), the control apparatus 2 interprets the contents of the access request. When recognizing that the relevant access request is for the file A, the control apparatus 2 searches the management table, and determines whether or not the file A is stored in the cache apparatus 4. When determining that the file A is stored in the cache apparatus 4, the control apparatus 2 sends a data transfer instruction based on the DAFS protocol to the cache apparatus 4 (Step S-12). At this time, the client apparatus 7 can be identified with the use of the IP address or such. At the same time, the control apparatus 2 attaches the storage location information for the file A to the data transfer instruction to be sent to the cache apparatus 4. The storage location information for the file A now includes the protection tag, which is replaced with 'ptag=yy' as mentioned above.

When receiving this data transfer request for the file A from the control apparatus 2, the cache apparatus 4 interprets the contents thereof, and recognizes that the instruction indicates data transfer to the client apparatus 7. The cache apparatus 4 then reads out the file A from the memory device 43, and sends the reply message to the client apparatus 7 (Step S-13). At this time, the cache apparatus 4 attaches the storage location information, including the protection tag 'ptag=yy' for the file A, received from the control apparatus 2 together with the data transfer instruction in Step S-11, to the reply message to be sent to the client apparatus 7. Then, the cache apparatus 4 allows the client apparatus 7 to directly access, in the RDMA manner, the thus-read-out file A (Step S-14). The newly provided storage location information for the file A is then again registered in the cache memory 71 in the client apparatus 7, with which storage location information the client apparatus 7 then can directly access the file A in the RDMA manner in the cache apparatus 4.

Thus. according to the first embodiment of the present invention, upon arising of an access request in the client apparatus 7, the cache memory 71 which is provided to store the storage location information for the file in the cache apparatus 4 is searched first. Then, when the relevant information is found out there, the client apparatus 7 can directly access the cache apparatus 4 for the file in the RDMA manner. Accordingly, it is possible to shorten the latency effectively. Furthermore, when the access frequency for the relevant file in the cache apparatus 4 by the specific client 7 lowers, or such a case, the protection tag of the storage location information may be changed by the control apparatus 2. Thereby, direct access by the specific client apparatus to the relevant file is not allowed according, and as a result, a safety of the stored data may be secured. Further, as a result of direct access by the specific client apparatus being thus denied the relevant storage location information in the cash memory 71 of the client apparatus 7 is finally deleted since an error occurs due to the denial of the direct access. Thereby, it is possible to save the storage capacity of the cache memory 71 of the client apparatus 7 and to achieve effective usage thereof.

Figure 12:
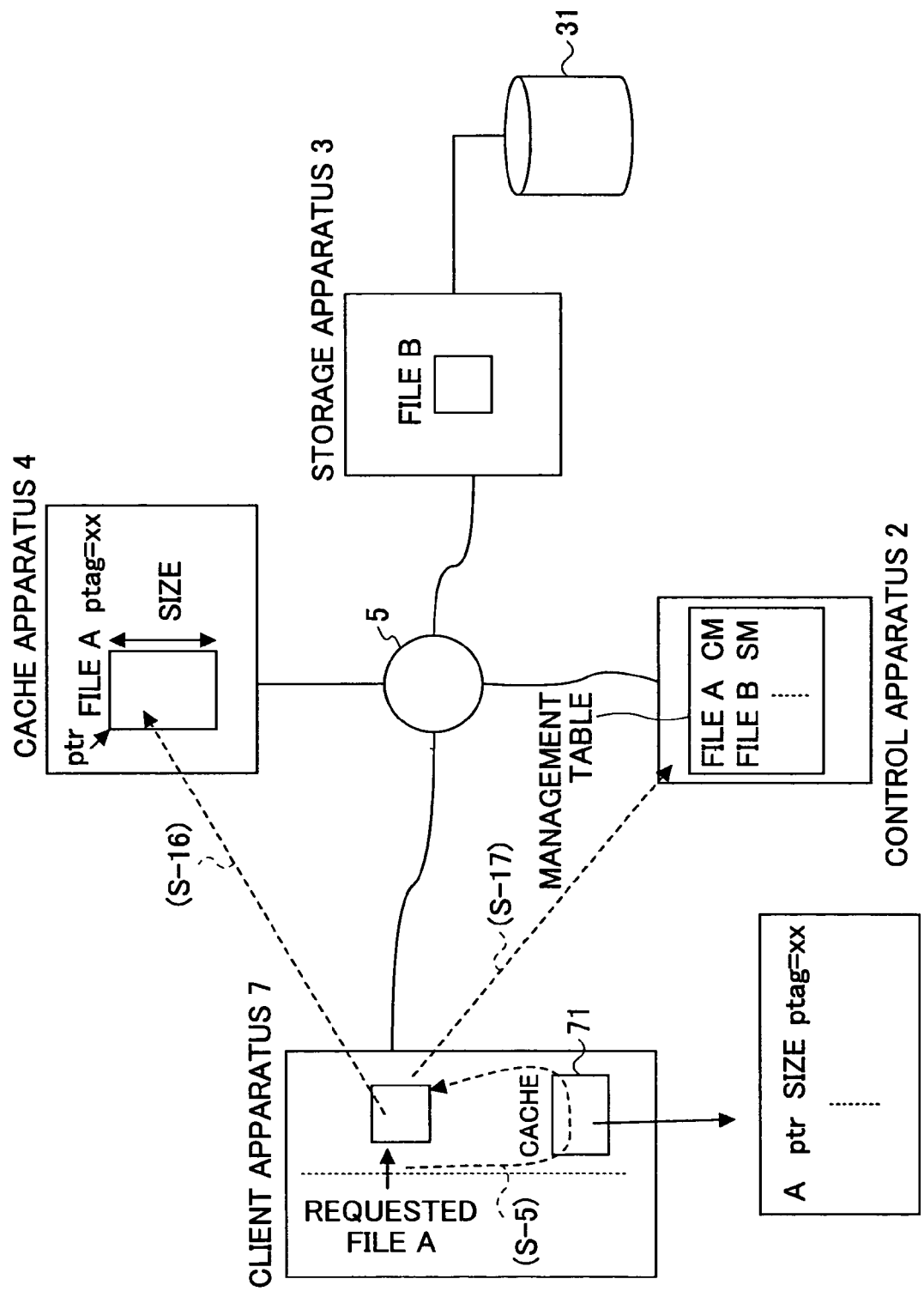
FIGS. 12 and 13 show processing of sending a writing request to the cache apparatus from the client apparatus.
Figure 13:
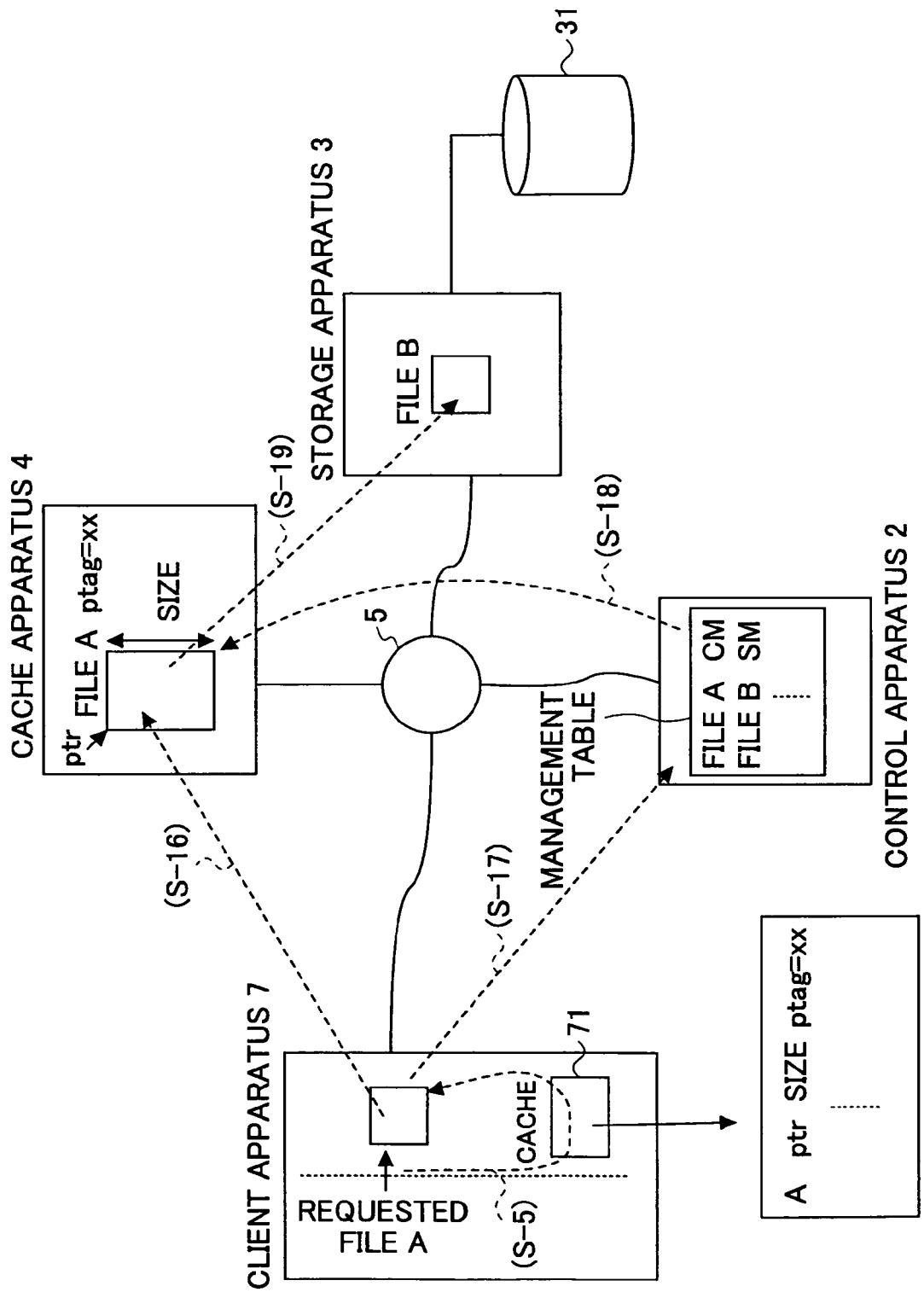
Figure 14:
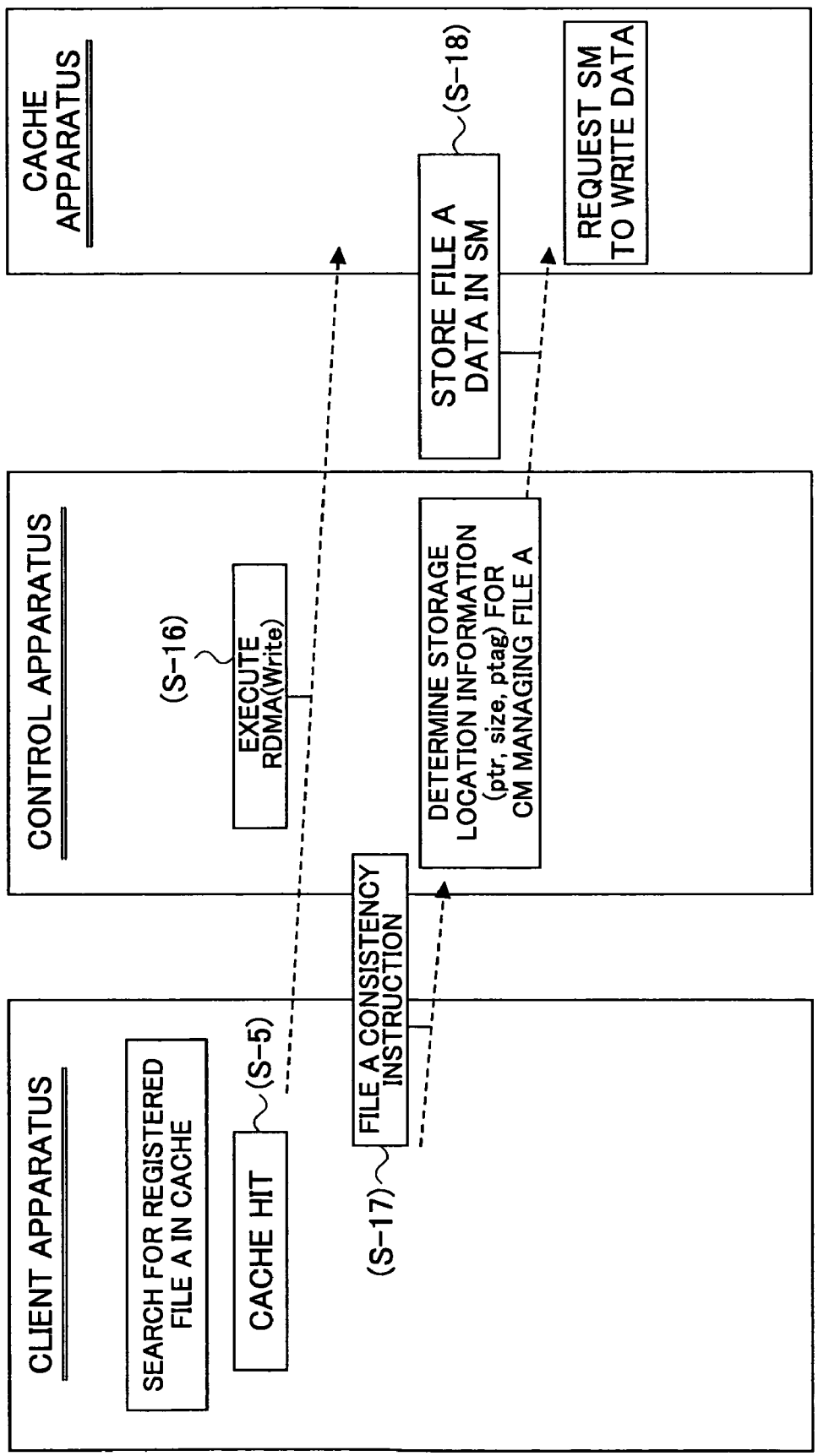
FIG. 14 shows a sequence chart of the processing of sending the writing request to the cache apparatus from the client apparatus.

FIGS. 12 and 13 shows processing of the client apparatus 7 making a writing request to the cache apparatus 4, and FIG. 14 shows a sequence chart of the same processing.

The data access responding system according to the first embodiment shown in FIG. 12, the same as that shown in FIG. 6 described above, includes the client apparatus 7 having the cache memory 71, and the storage system including the storage apparatus 3, the cache apparatus 4 and the control apparatus 2, connected to the client apparatus 7 via the communication network 5.

The client apparatus 7, the storage apparatus 3, the cache apparatus 4 and the control apparatus 2 can communicate mutually via the communication network 5, by their communication functions.

In the cache apparatus 4, the same as in FIG. 6, the file A is stored. The file A has the pointer 'ptr' indicating the data storage location; the information 'size' indicating the data size; and the protection tag 'ptag' for providing a function of allowing only a predetermined client apparatus to access are set. Also, the file B is stored in the storage apparatus 3.

In the control apparatus 2, the same as in FIG. 6, the management table is provided in which the storage destination apparatuses of respective files stored in the respective ones of the storage apparatus 3 and the cache apparatus 4, and so forth are recorded. Specifically, the cache apparatus CM acts as the storage destination apparatus for the file A, while the storage apparatus SM acts as the storage destination apparatus for the file B as mentioned above.

In the client apparatus 4, the same as in FIG. 6, the cache memory 71 storing the storage location information (the file name 'A'; the pointer 'ptr'; the file size 'size'; the protection tag 'ptag=xx') of the file A stored in the cache apparatus 4 is provided. In this case, the same as in FIG. 6, the storage location information (the file name 'A'; the pointer 'ptr'; the file size 'size'; the protection tag 'ptag=xx') for the file A is actually stored in the cache memory 71 of the client apparatus 4.

In this case, as shown in FIGS. 12 and 14, when an access request with a writing request is made from the client apparatus 7 having the relevant storage location information already stored therein, the client apparatus 7 first searches the cache memory 71 for the storage location information of the file A concerning the current access request. Then, when recognizing that the storage location information for the file A is stored in the cache memory 71 (Step S-5), the client apparatus 7 directly accesses the cache apparatus 4 in the RDMA manner based on this storage location information for the file A without making an access request to the control apparatus 2. Then, in this case, the client apparatus 7 requests predetermined writing processing as mentioned above to the cache apparatus 4 in the RDMA manner (Step S-16). As a result, the data of the file A is updated through the predetermined writing processing carried out in the cache apparatus 4 in response to the request from the client apparatus 7. Then, the client apparatus 7 sends the control apparatus 2 an instruction for achieving consistency of data of the file A (Step S-17 of FIG. 13).

Then, as shown in FIGS. 13 and 14, the control apparatus 2 receives the instruction for achieving consistency of the data of the file A, which data is updated as mentioned above in Step S-16, from the client apparatus 7, and the control apparatus 2 determines the storage location information ('ptr', 'size' and 'ptag') in the cache apparatus (CM) 4 for the file A from the management table, and sends a consistency instruction to the cache apparatus 4 for causing it to write the data once written in the file A then in the storage apparatus 4 so to make the same updating also in the file A stored in the storage apparatus 4 (Step S-18). In response to this consistency instruction, the cache apparatus 4 requests the storage apparatus 3 such that the storage apparatus 3 writes the same data in the file A of its own. In response thereto, the storage apparatus 3 actually writes the data in the file A so as to update the file A (Step S-19).

Thus, when an access request made by the client apparatus 7 requires data writing in the cache apparatus 4 so as to update the original data, the client apparatus 7 also sends the consistency instruction to the control apparatus 2, which then sends the consistency instruction to the cache apparatus 4. In response thereto, the cache apparatus 4 makes the relevant updating also in the storage apparatus 3. Accordingly, consistency of the stored data between the cache apparatus 4 and the storage apparatus 3 is achieved.

A second embodiment of the present invention is described now.

According to the second embodiment of the present invention, in comparison to the above-described first embodiment, information concerning a cache area in the client apparatus 7 is notified of to the control apparatus 2. Then, storage location information of data for which an access frequency is high in the cache apparatus 4 can be written in the cache area of the client apparatus 7. Other than this point, the configuration of the data access responding system and the function of the client apparatus 7 making access requests are the same as those of the first embodiment. Accordingly, relationship between the client apparatus 7 and the control apparatus 2 different from that of the first embodiment is described.

Figure 15:
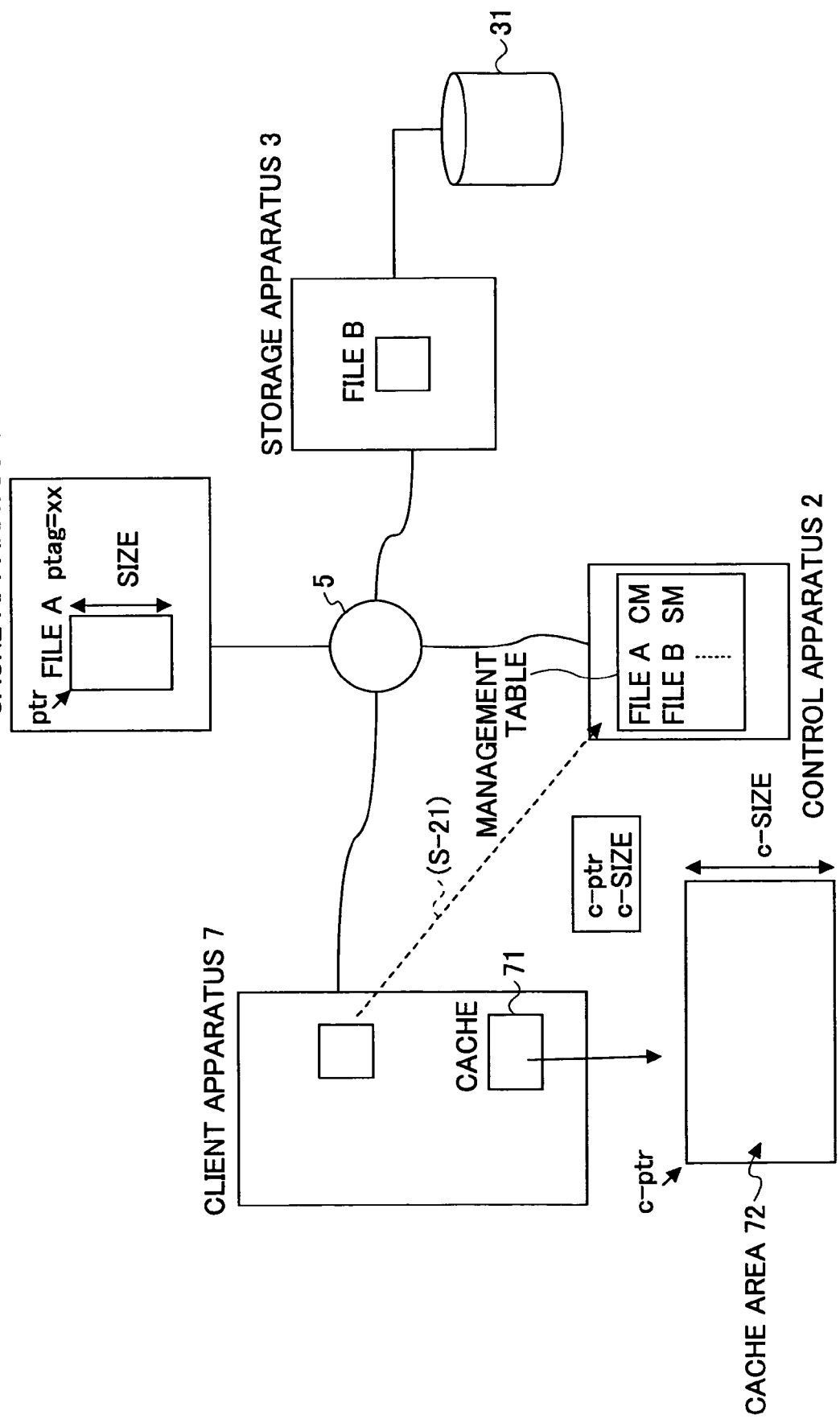
FIGS. 15 through 17 show processing, in a data access responding system according to a second embodiment of the present invention, of communicating information concerning a cache area and storage location information between a client apparatus having the cache area in a memory and a control apparatus managing information of a storage location of the data.
Figure 16:
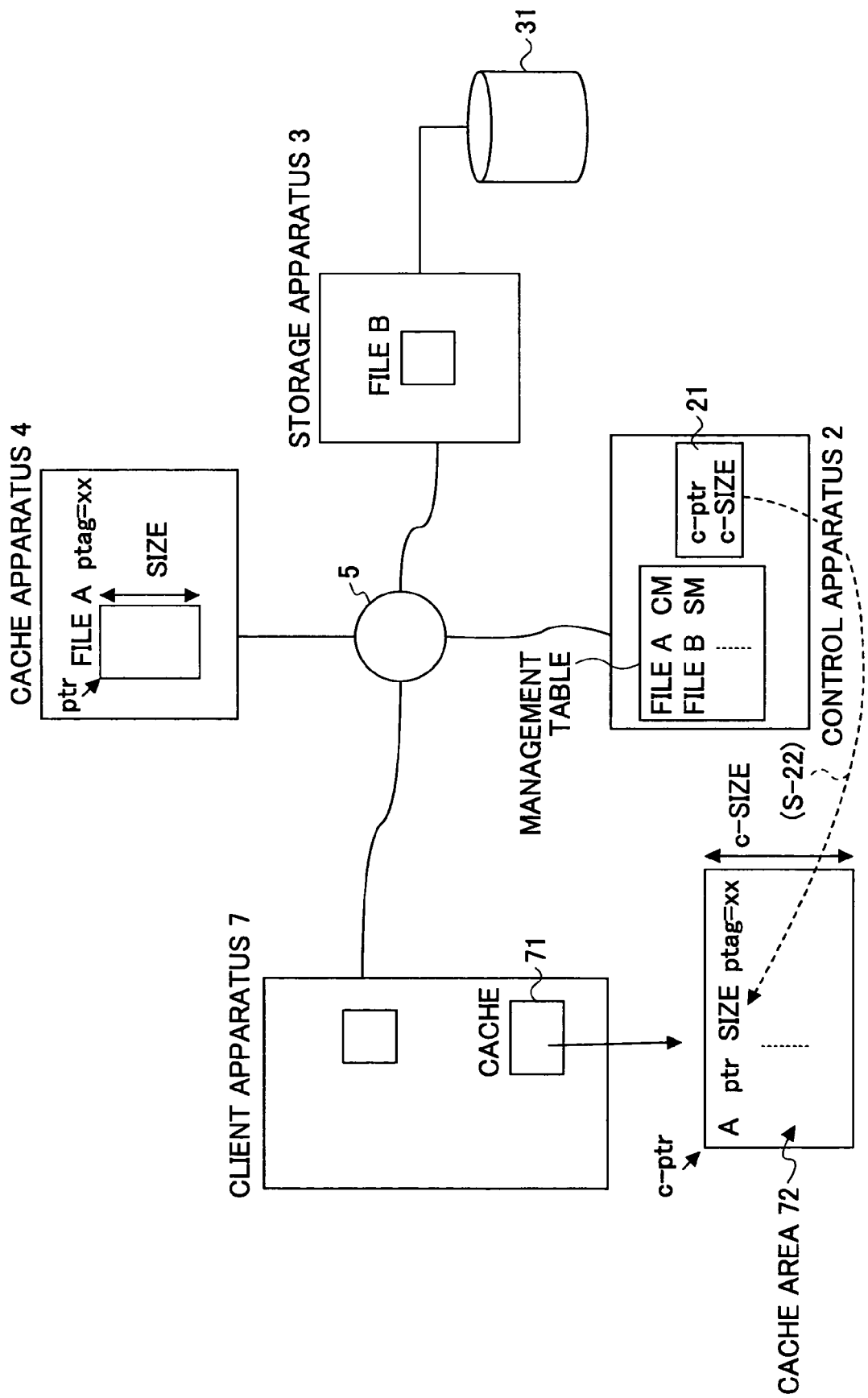
Figure 17:
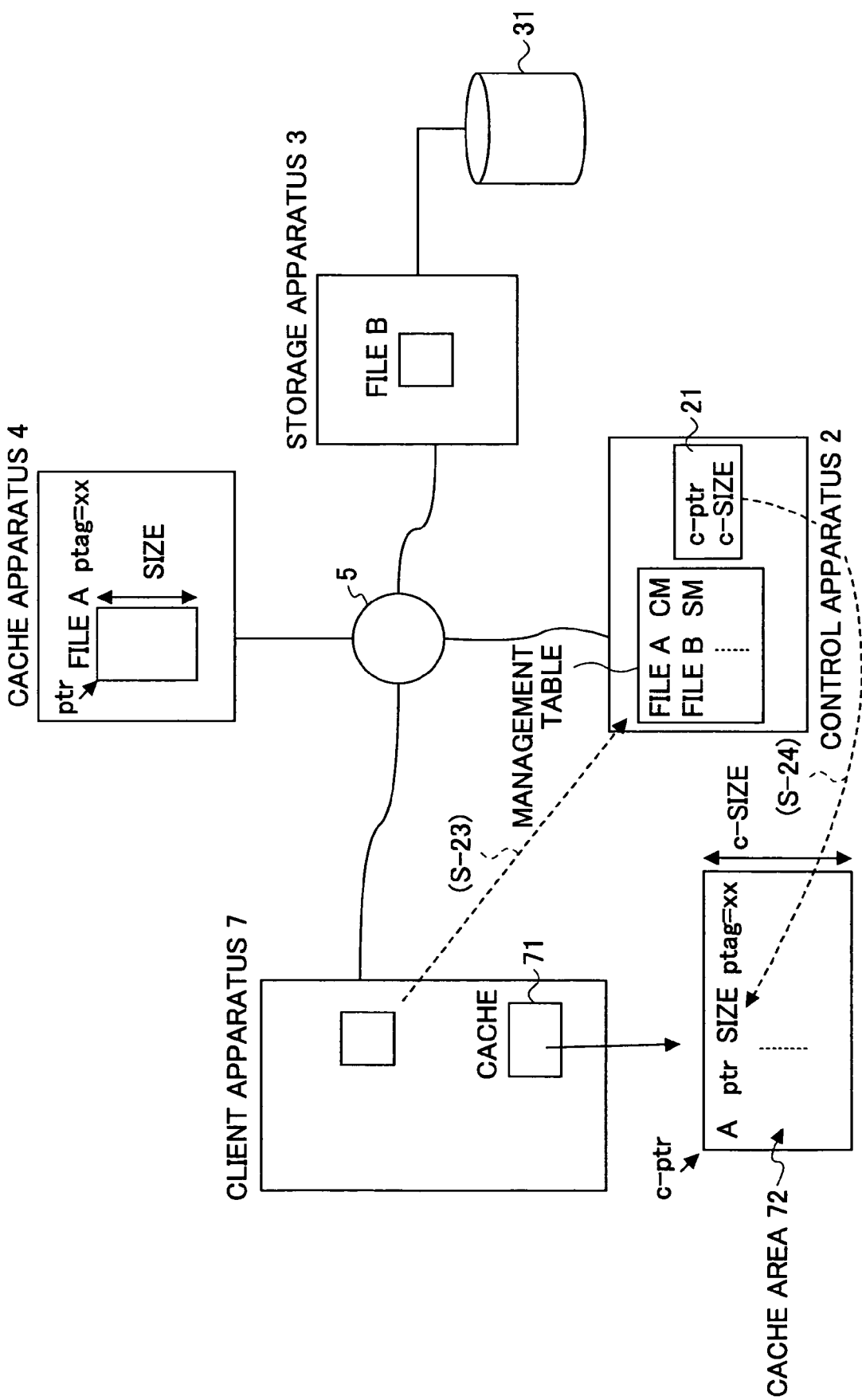
Figure 18:
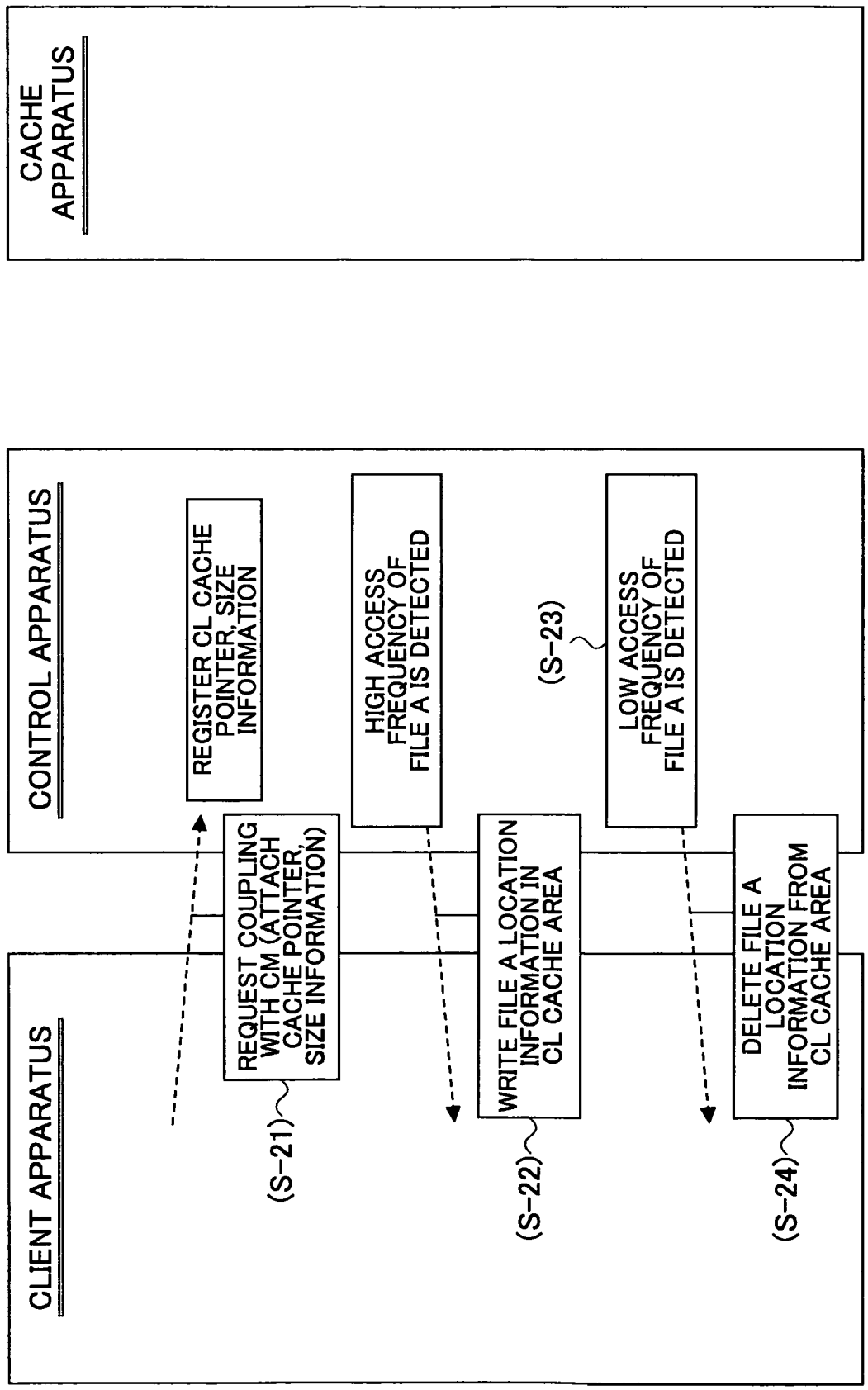
FIG. 18 shows a sequence chart of communication of information concerning the cache area and the storage location information between the client apparatus and the control apparatus.

FIGS. 15 through 17 shows processing of communicating information of the cache area or the storage location information between the client apparatus having the cache area in a memory and the control apparatus managing the data storage location information, in the data access responding system according to the second embodiment of the present invention. FIG. 18 shows a sequence chart of the same processing.

The data access responding system according to the second embodiment shown in FIGS. 15-17 includes the client apparatus 7 having the cache memory 71 including the above-mentioned cache area 72, and the storage system including the storage apparatus 3, the cache apparatus 4 and the control apparatus 2, connected to the client apparatus 7 via the communication network 5.

The client apparatus 7, the storage apparatus 3, the cache apparatus 4 and the control apparatus 2 can communicate mutually via the communication network 5, by their communication functions.

In the cache apparatus 4, the file A is stored. The file A has the pointer 'ptr' indicating the data storage location; the information 'size' indicating the data size; and the protection tag 'ptag' for providing a function of allowing only a predetermined client apparatus to access are set. Also, the file B is stored in the storage apparatus 3.

In the control apparatus 2, the same as in FIG. 6, the management table is provided in which the storage destination apparatuses of respective files stored in the respective ones of the storage apparatus 3 and the cache apparatus 4, and so forth are recorded. Specifically, the cache apparatus CM acts as the storage destination apparatus for the file A, while the storage apparatus SM acts as the storage destination apparatus for the file B as mentioned above.

In the client apparatus 4, the cache memory 71 has the cache area 72 having a predetermined storage size, and stores the storage location information of the file A stored in the cache apparatus 4, for example.

As shown in FIGS. 16 and 17, the file name 'A', the pointer 'ptr', the file size 'size' and the protection tag 'ptag=xx' may be written in or may be deleted from the cache area 72 in the cache memory 71 of the client apparatus 7 according to the second embodiment.

When the client apparatus 7 is newly connected to the communication network 5 or initializes the connection, the client apparatus 7 notifies the control apparatus 2 of information concerning the cache area 72 of its own (Step S-21), and the control apparatus 2 can store this information in a memory area 21 of its own. At this time, the information sent from the client apparatus 7 to the control apparatus 2 includes a cache pointer 'c-ptr' and a cache size 'c-size' of the cache area 72, such that the control apparatus 2 can recognize how much size of information can be written in the cache area 72.

As shown in FIGS. 15 through 18, when the connection of the client apparatus 7 with the communication network 5 is reset (initialized) for example, the client apparatus 7 sends a cache apparatus coupling request to the control apparatus 2 with an attachment including the information of the pointer (c-ptr) and the size (c-size) of the cache area 72 (Step S-21). The cache apparatus coupling request is a request for achieving coupling with the cache apparatus 4. The control apparatus 2 receiving this request with the attachment from the client apparatus 7 registers the information of the pointer (c-ptr) and the size (c-size) of the cache area 72 of the client apparatus 7 included in the attachment in the memory area 21 of its own.

Then, the control apparatus 2 monitors access requests made for the cache apparatus 4 by the client apparatus 7, and, when detecting that an access frequency to the file A stored in the cache apparatus 7 from the client 7 is high in a certain level for example, the control apparatus 2 writes, in the cache area 72 of the client apparatus 4, the storage location information of the file A in the cache apparatus 4 (Step S-22). On the other hand, when detecting that the access frequency to the file A stored in the cache apparatus 7 from the client 7 lowers to a certain level, the control apparatus 2 deletes, from the cache area 72 of the client apparatus 4, the once written storage location information of the file A in the cache apparatus 4 (Step S-23).

The access frequency to the cache apparatus 4 is not necessarily limited to that of access requests made by the relevant client apparatus 7 but may be determined based on the access frequencies of all the client apparatuses 7 existing in the data access responding system or a plurality of specific ones thereof, for example.

Thus, according to the second embodiment of the present invention, the control apparatus 2 recognizes the available storage size of the cache area 72 of the client apparatus 7, and, writes in or deletes from the cache area 72 the storage location information for data stored in the cache apparatus 4 according to the actual access frequency for the relevant data, also according to the available storage size of the cache area 72. As a result, the client apparatus 7 can hold in itself the storage location information for the data for which the access frequency is high. With the use of the storage location information thus held in the cache area 72, the client apparatus 7 can directly access the cache apparatus 7 for the relevant data. As a result, it is possible to shorten the latency required along with each access request. Further, the control apparatus 2 may determine whether or not the storage location information for the data stored in the cache apparatus 4 should be stored in or should be deleted from the cache area 72 also in consideration of the available storage size in the cache area 72 of the client apparatus 7. As a result, it is possible to effectively utilize the cache area 72 of the client apparatus 7.

Figure 19:
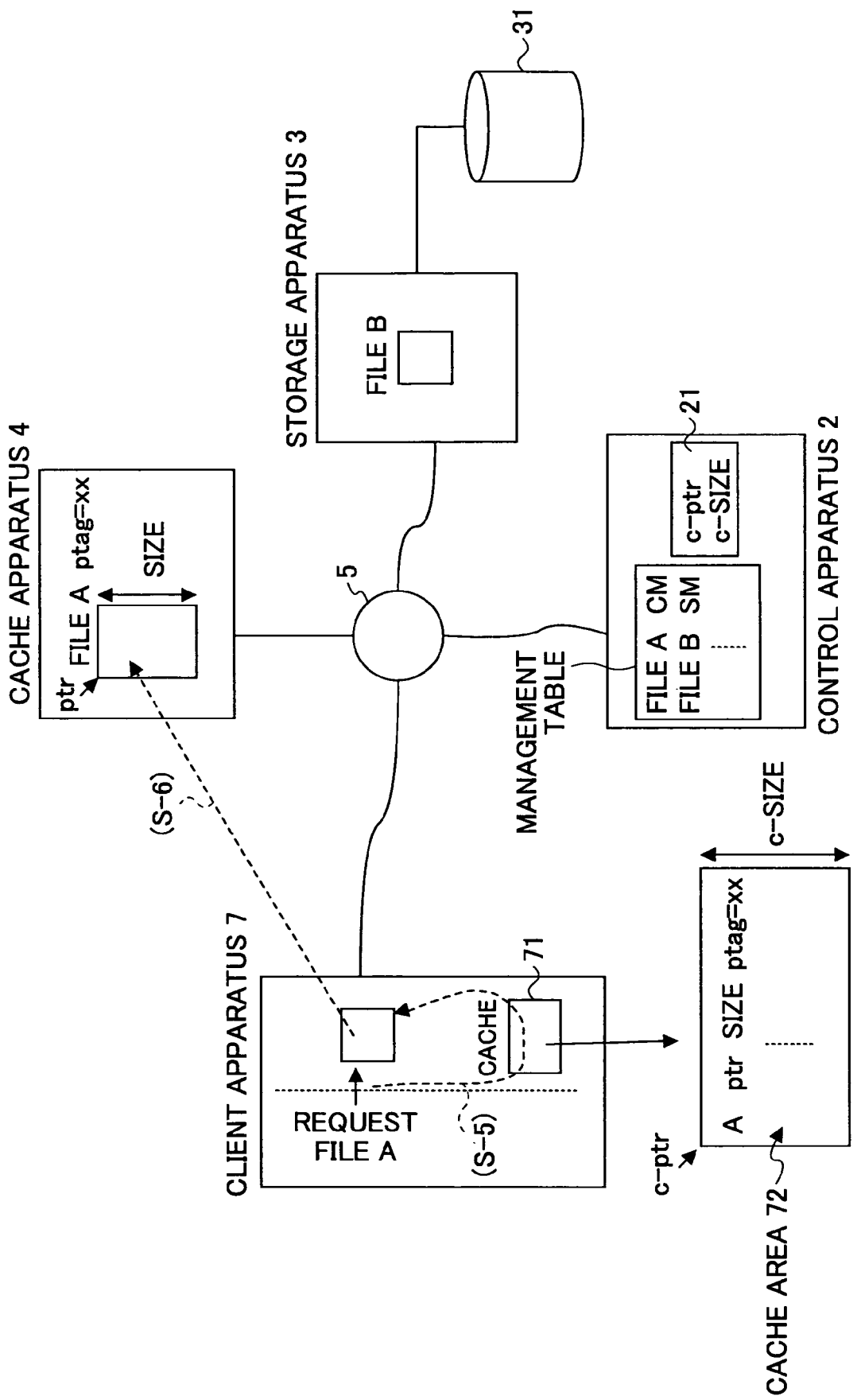
FIGS. 19 through 21 show processing of the client apparatus making an access request based on information written in the cache area.
Figure 20:
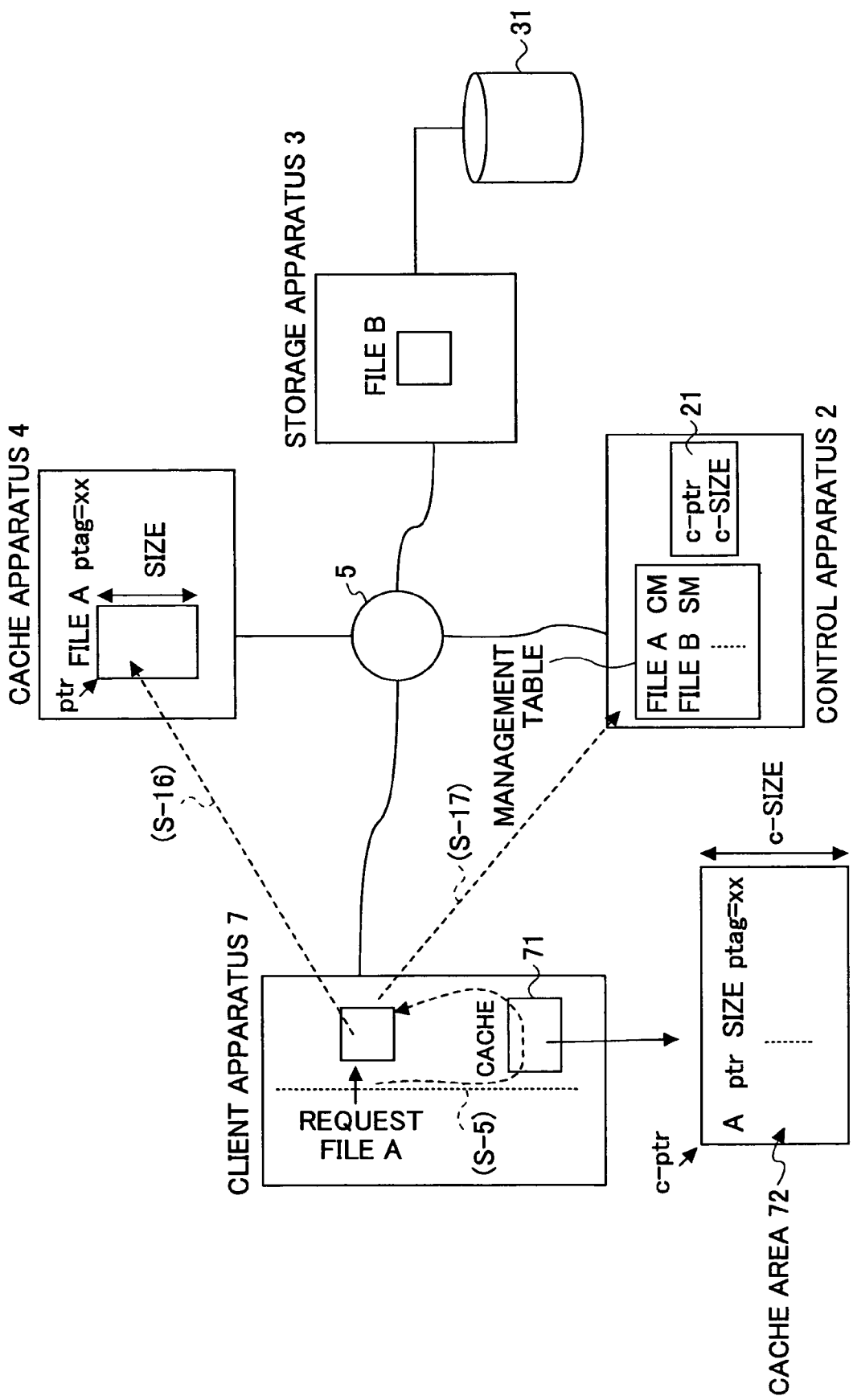
Figure 21:
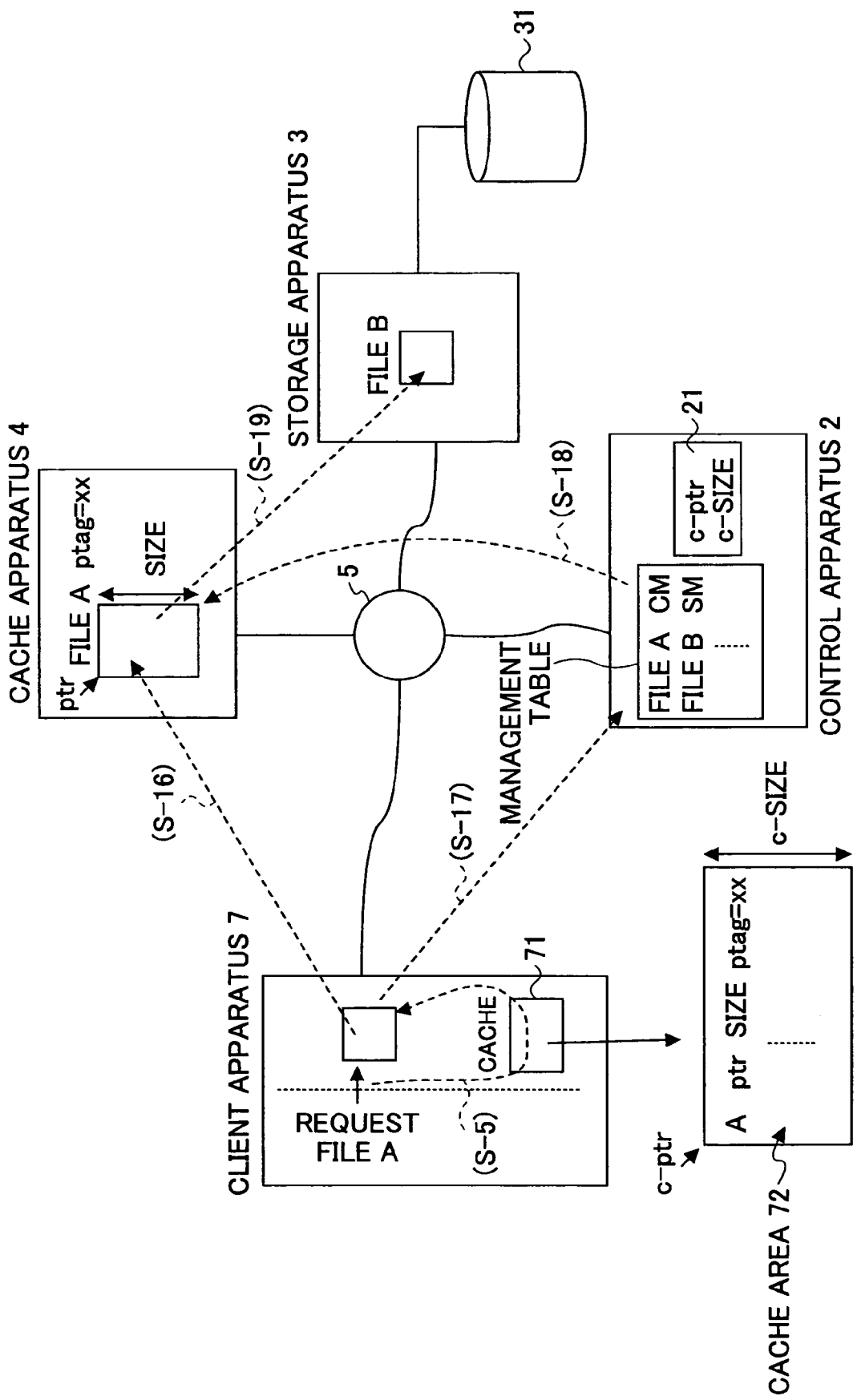

FIGS. 19 through 21 shows processing of the client apparatus 7 making an access request based on the information written in the cache area 72 of its own.

The data access responding system according to the second embodiment shown in FIGS. 19-21, the same as in FIG. 17, includes the client apparatus 7 having the cache memory 71 including the cache area 72, and the storage system, including the storage apparatus 3, the cache apparatus 4 and the control apparatus 2, connected to the client apparatus 7 via the communication network 5.

The client apparatus 7, the storage apparatus 3, the cache apparatus 4 and the control apparatus 2 can communicate mutually via the communication network 5, by their communication functions.

In the cache apparatus 4, the same as in FIG. 17, the file A is stored. The file A has the pointer 'ptr' indicating the data storage location; the information 'size' indicating the data size; and the protection tag 'ptag' for providing a function of allowing only a predetermined client apparatus to access are set. Also, the file B is stored in the storage apparatus 3.

In the control apparatus 2, the same as in FIG. 17, the management table is provided in which the storage destination apparatuses of files stored in the respective ones of the storage apparatus 3 and the cache apparatus 4, and so forth are recorded. Specifically, the cache apparatus CM acts as the storage destination apparatus for the file A, while the storage apparatus SM acts as the storage destination apparatus for the file B as mentioned above.

In the client apparatus 4, the same as in FIG. 17, the cache memory 71 has the cache area 72 having the predetermined storage size, and stores the storage location information of the file A stored in the cache apparatus 4 as mentioned above with reference to FIGS. 16 and 18 (Step S-22).

As shown in FIGS. 19 through 21, the file name 'A', the pointer 'ptr', the file size 'size' and the protection tag 'ptag=xx' may be written in or may be deleted from the cache area 72 in the cache memory 71 of the client apparatus 7.

As shown in FIG. 19, when an access request for the file A is made by the client apparatus 7 having the relevant storage location information already stored in the cache area 72, the client apparatus 7 first searches the cache area 72 of the cache memory 71 for the storage location information for the file A concerning the current access request. Then, when recognizing that the storage location information for the file A is stored in the cache area 72 (Step S-5), the client apparatus 7 directly accesses the cache apparatus 4 in the RDMA manner based on this storage location information for the file A without making an access request to the control apparatus 2 (Step S-6).

Thus, according to the first embodiment of the present invention, the storage location information for the data stored in the cache apparatus 4 is stored in the client apparatus 7, and, then, when a necessity arises to access the same data, the client apparatus 7 directly accesses the cache apparatus 4 in the RDMA manner without making an access request to the control apparatus 2. Accordingly, it is possible to further shorten the latency required along with access request.

As shown in FIG. 20, in a case where an access request made by the client apparatus 7 includes a writing request, when the access request is by from the client apparatus 7 having the relevant storage location information already stored therein, the client apparatus 7 first searches the cache memory 71 for the storage location information of the file A concerning the current access request. Then, when recognizing that the storage location information for the file A is stored in the cache area 72 (Step S-5), the client apparatus 7 directly accesses the cache apparatus 4 in the RDMA manner based on this storage location information for the file A without making an access request to the control apparatus 2. Then, in this case, the client apparatus 7 requests predetermined writing processing to the cache apparatus 4 in the RDMA manner (Step S-16). As a result, the data of the file A is updated through the predetermined writing processing carried out in the cache apparatus 4 in response to the request from the client apparatus 7. Then, the client apparatus 7 sends the control apparatus 2 an instruction for achieving consistency of data of the file A (Step S-17).

Then, as shown in FIG. 21, the control apparatus 2 receiving the instruction for achieving consistency of the data of the file A from the client apparatus 7, which data is updated as mentioned above in Step S-16, the control apparatus 2 determines the storage location information ('ptr', 'size' and 'ptag') for the file A stored in the cache apparatus (CM) 4 from the management table, and sends a consistency instruction to the cache apparatus 4 for writing the same data as that once written in the file A in the cache apparatus 3 then in the storage apparatus 4 (Step S-18). In response to this consistency instruction, the cache apparatus 4 requests the storage apparatus 3 to write the data in the file A in the storage apparatus 3. In response thereto, the storage apparatus 3 writes the data in the file A so as to update the file A (Step S-19).

Thus, also for a case where the access request made by the client apparatus 7 requires data writing in the cache apparatus 4 so as to update the original data, the client apparatus 7 directly accesses the cache apparatus 4 in the RDMA manner when the storage location information for the relevant data is stored in the cache area 72. Accordingly, it is possible to shorten the latency required along with access request. Further, the client apparatus 7 sends the consistency instruction to the control apparatus 2, which then sends the consistency instruction to the cache apparatus 4. In response thereto, the cache apparatus 4 makes the same updating in the file A stored in the storage apparatus 3. Accordingly, consistency of the stored data between the cache apparatus 4 and the storage apparatus 3 is achieved.

A third embodiment of the present invention is described now.

In the third embodiment, in comparison to the above-described second embodiment, the client apparatus 7 itself manages the access request frequency, and, based on the management result, the client apparatus 7 requests the control apparatus 2 to write the storage location information for the data for which the access frequency is high in the cache area 72 of its own. Other than this point, the third embodiment is the same as the second embodiment, and only the different point is described.

Figure 22:
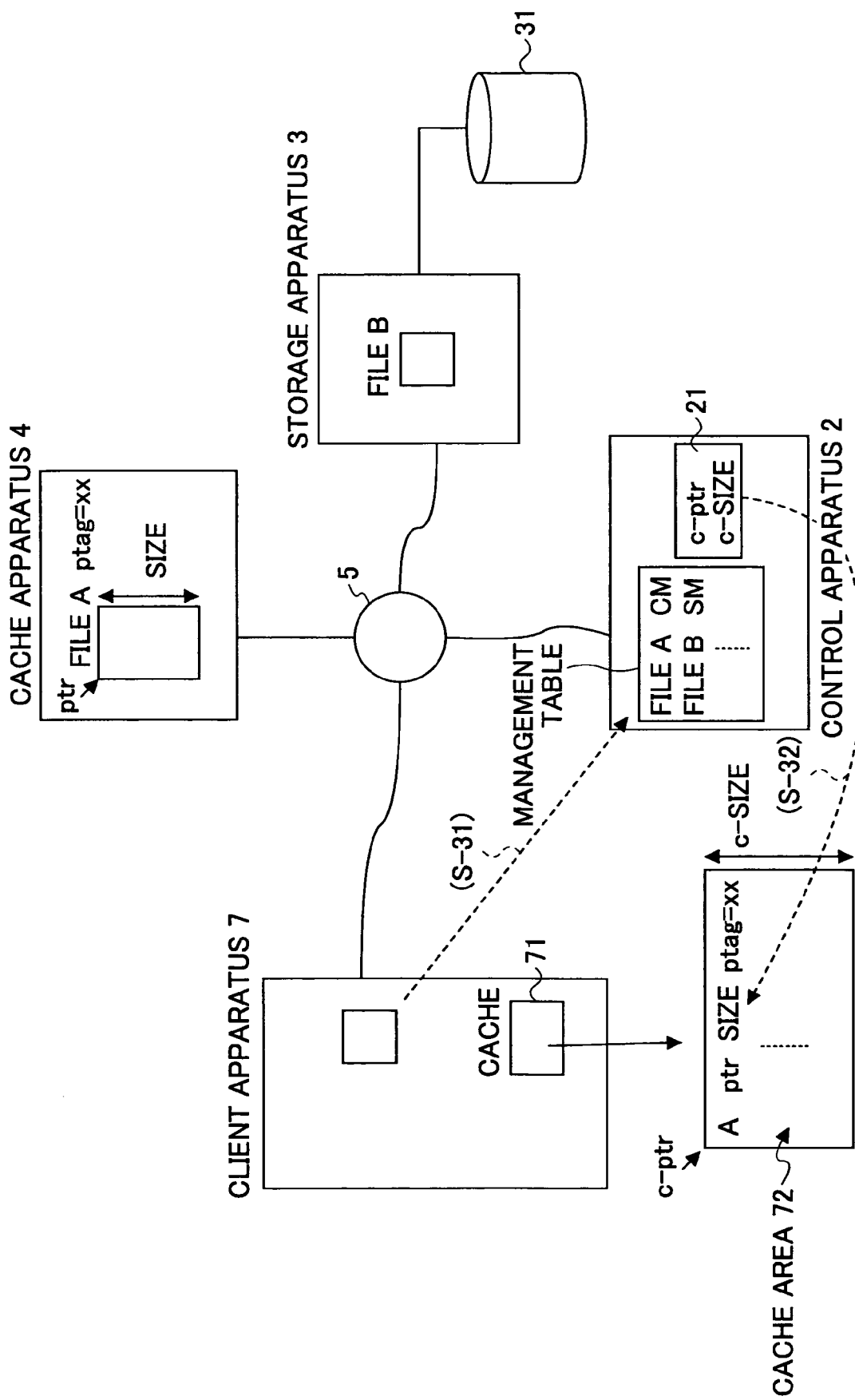
FIGS. 22 and 23 show processing of a client apparatus according to a third embodiment of the present invention requesting a control apparatus, registration of storage location information, according to an access frequency managed by itself.
Figure 23:
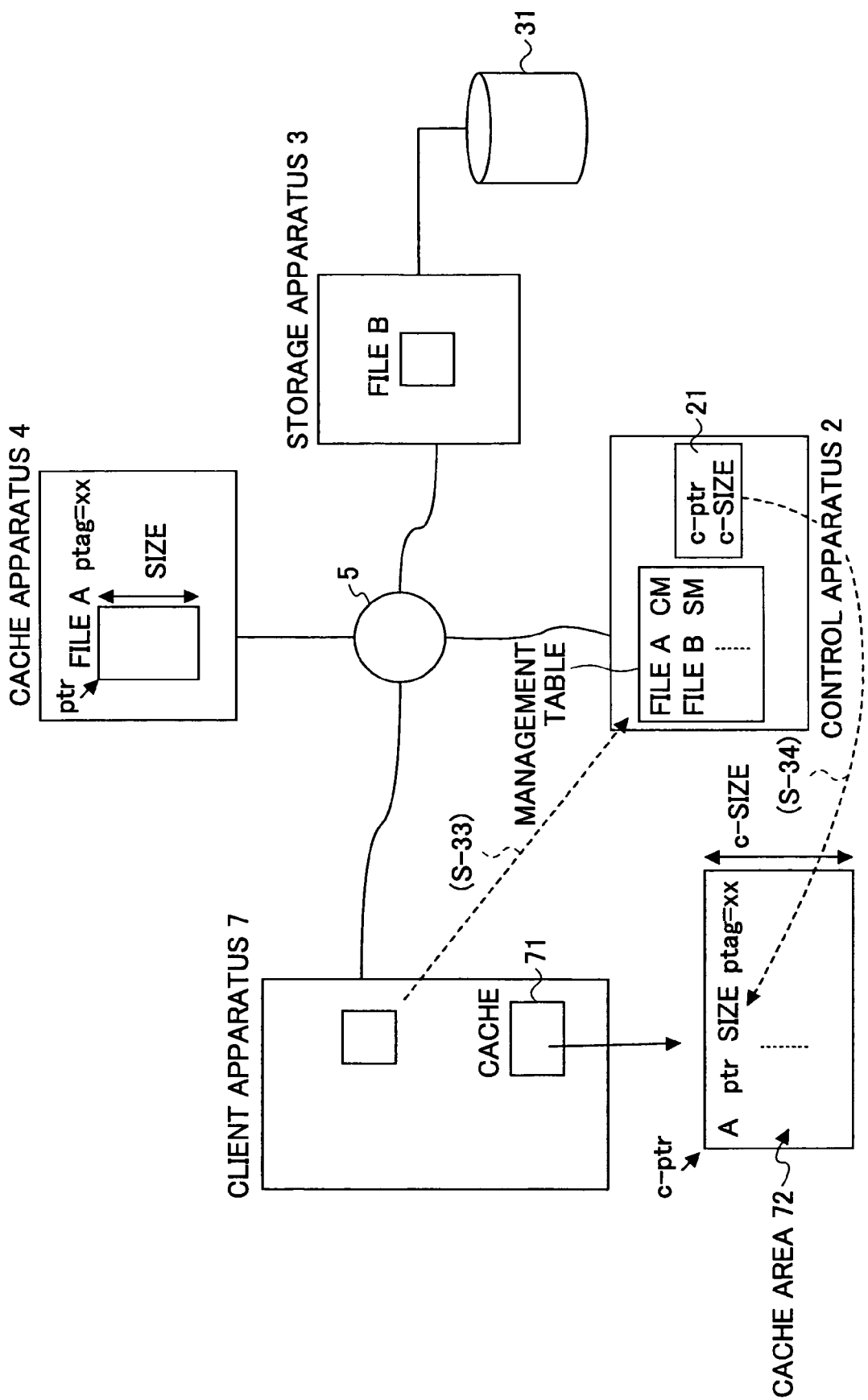
Figure 24:
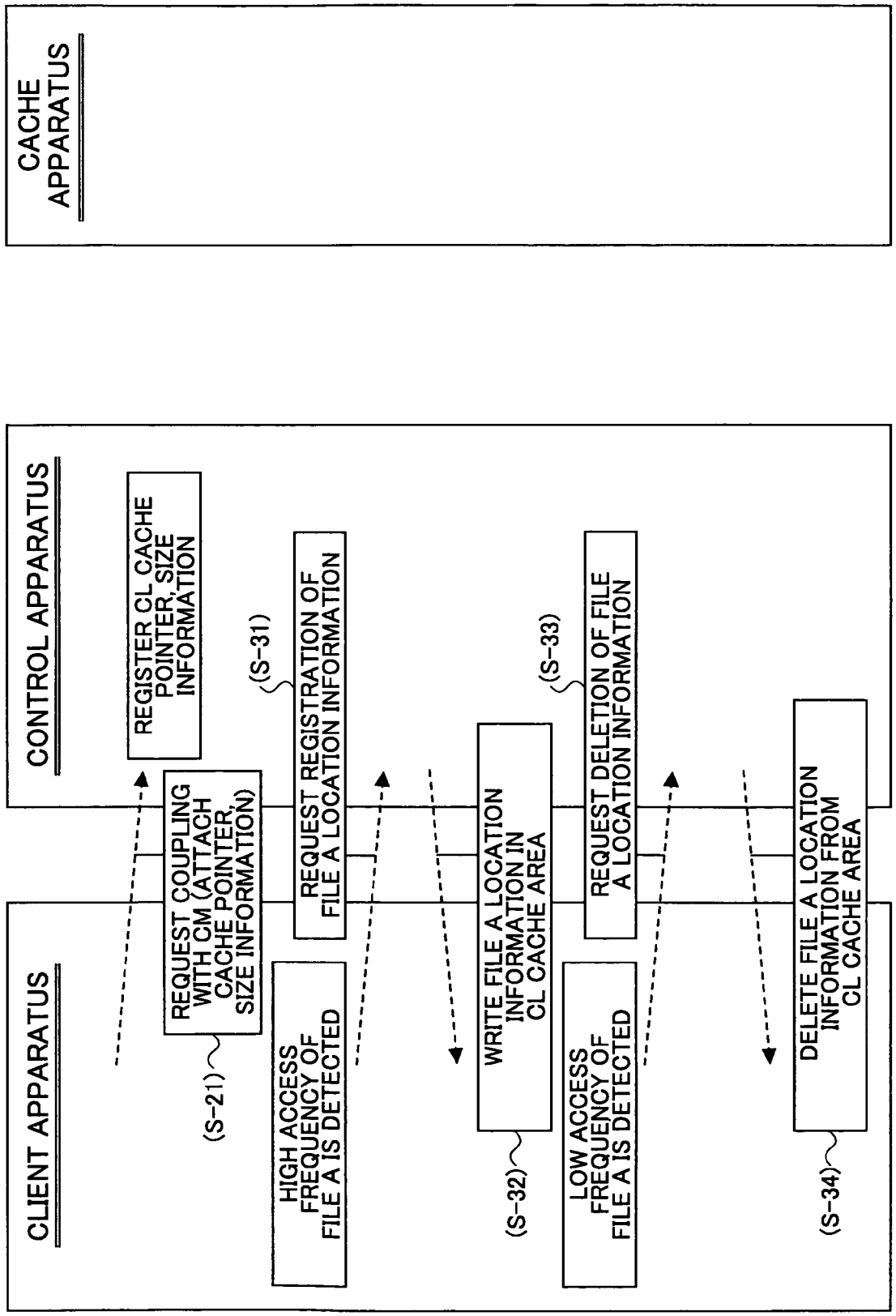
FIG. 24 shows a sequence chart of the client apparatus requesting the control apparatus, registration of the storage location information.
Figure 25:
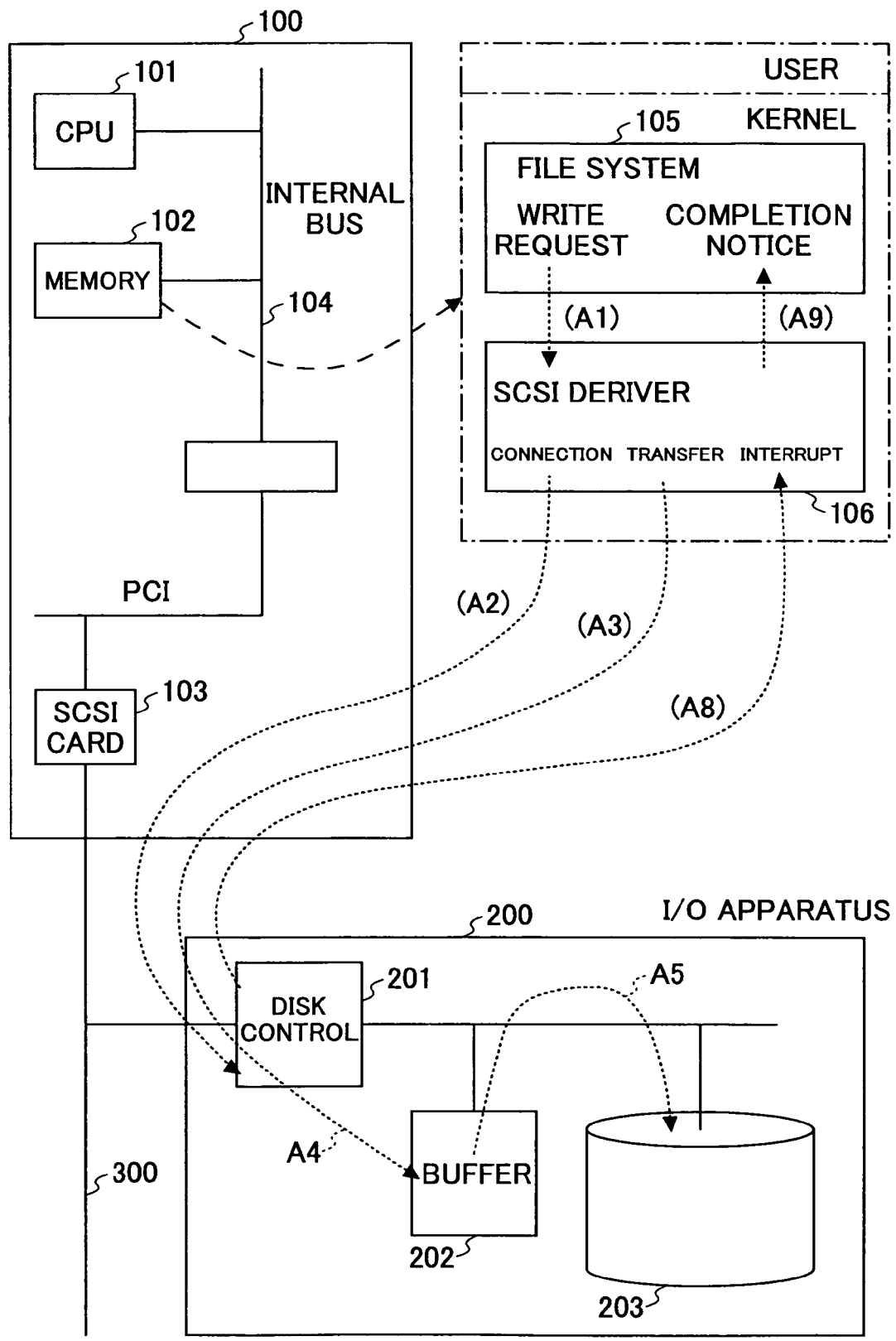
FIG. 25 shows one example of a storage system in the related art.

FIGS. 22 and 23 show processing of the client apparatus 7 requesting the control apparatus 2 to register the storage location information according to the access frequency managed by itself, in the data access responding system according to the third embodiment of the present invention. FIG. 24 shows a sequence chart of the same processing.

The data access responding system according to the third embodiment shown in FIGS. 22 and 23 includes, the same as in FIGS. 15-17, the client apparatus 7 having the cache memory 71 including the cache area 72, and the storage system including the storage apparatus 3, the cache apparatus 4 and the control apparatus 2, connected to the client apparatus 7 via the communication network 5.

The client apparatus 7, the storage apparatus 3, the cache apparatus 4 and the control apparatus 2 can communicate mutually via the communication network 5, by their communication functions.

In the cache apparatus 4, the same as in FIGS. 15-17, the file A is stored. The file A has the pointer 'ptr' indicating the data storage location; the 'size' indicating the data size; and the protection tag 'ptag' for allowing only a predetermined client apparatus to access are set. Also, the file B is stored in the storage apparatus 3.

In the control apparatus 2, the same as in FIGS. 15-17, the management table is provided in which the storage destination apparatuses of respective files stored in the respective ones of the storage apparatus 3 and the cache apparatus 4, and so forth are recorded. Specifically, the cache apparatus CM acts as the storage destination apparatus for the file A, while the storage apparatus SM acts as the storage destination apparatus for the file B as mentioned above.

In the client apparatus 4, the same as in FIGS. 15-17, the cache memory 71 has the cache area 72 having a predetermined storage size, and stores the storage location information of the file A stored in the cache apparatus 4 for example.

As shown in FIGS. 21 and 22, the same as in FIGS. 16 and 17, the file name 'A', the pointer 'ptr', the file size 'size' and the protection tag 'ptag=xx' may be written in or may be deleted from the cache area 72 in the cache memory 71 of the client apparatus 7 also according to the third embodiment.

As shows in FIGS. 22 and 23, when the connection of the client apparatus 7 with the communication network 5 is reset (initialized) for example, the client apparatus 7 sends a cache apparatus coupling request to the control apparatus 2 with an attachment including the information of the pointer (c-ptr) and the size (c-size) of the cache area 72 (Step S-21). The cache apparatus coupling request is a request for achieving coupling with the cache apparatus 4. The control apparatus 2 receiving this request with the attachment from the client apparatus 7 registers the information of the pointer (c-ptr) and the size (c-size) of the cache area 72 of the client apparatus 7 included in the attachment in the memory area 21 of its own.

Then, the client apparatus 7 manages access requests made by itself for the cache apparatus 4, and, when detecting that the access frequency to the file A stored in the cache apparatus 7 from itself is high in a certain level for example, the client apparatus 7 requests the control apparatus 2 to register the storage location information of the file A in the cache area 72 of its own (Step S-31). The control apparatus receiving this request from the client apparatus 7 writes the storage location information of the file A in the cache area 72 of the client apparatus 7 (Step S-32).

On the other hand, when detecting that the access frequency to the file A stored in the cache apparatus 7 from its own lowers to a certain level, the client apparatus 7 requests the control apparatus 2 to delete the once-written storage location information of the file A from the cache area 72 of its own (Step S-33). The control apparatus receiving this request from the client apparatus 7 deletes the storage location information of the file A from the cache area 72 of the client apparatus 7 (Step S-34).

Thus, according to the third embodiment, since each client apparatus 7 itself manages the access frequency of access requests by its own to the data stored in the cache apparatus 4, the client apparatus 7 itself can adjust the access frequency according to its own situation, respectively.

Further, the present invention is not limited to the above-described embodiments, and variations and modifications may be made without departing from the basic concept of the present invention claimed below.

What is claimed is:

1. A data access responding system, comprising:
a storage apparatus storing data;
a cache apparatus which acts as a cache for the data stored in said storage apparatus;
a client apparatus processing the data; and
a control apparatus managing storage locations of the data in said storage apparatus and in said cache apparatus, which are connected via a communication network,
wherein said control apparatus provides a transfer instruction to one of said storage apparatus and said cache apparatus, in which one the relevant data is stored, when receiving an access request from said client apparatus for the data; and
said one of said storage apparatus and said cache apparatus receiving said transfer instruction directly returns to said client apparatus a reply message accompanied by information of the storage location of the relevant data,
wherein said one of said storage apparatus and said cache apparatus in which the relevant data is stored comprises said cache apparatus; and
said client apparatus has a memory storing said information of the storage location,
wherein said client apparatus directly accesses said cache apparatus when making an access request for the data for which the information of the storage location is stored in said memory, without making an access request to said control apparatus, and has the data transferred thereto from said cache apparatus,
wherein said client apparatus is prevented from directly accessing said cache apparatus for the data, as a result of the information of the storage location of the data being changed, and
wherein said client apparatus deletes the information of the storage location from said memory and makes access request to said control apparatus, when direct access to said cache apparatus is not allowed.

2. A data access responding system, comprising:
a storage apparatus storing data;
a cache apparatus which acts as a cache for the data stored in said storage apparatus;
a client apparatus processing the data; and
a control apparatus managing storage locations of the data in said storage apparatus and in said cache apparatus, which are connected via a communication network, wherein:
said control apparatus provides a transfer instruction to one of said storage apparatus and said cache apparatus, in which one the relevant data is stored, when receiving an access request from said client apparatus for the data; and
said one of said storage apparatus and said cache apparatus receiving said transfer instruction directly returns to said client apparatus a reply message accompanied by information of the storage location of the relevant data,
wherein said one of said storage apparatus and said cache apparatus in which the relevant data is stored comprises said cache apparatus; and
said client apparatus has a memory storing said information of the storage location,
wherein said client apparatus directly accesses said cache apparatus when making an access request for the data for which the information of the storage location is stored in said memory, without making an access request to said control apparatus, and has the data transferred thereto from said cache apparatus, and
wherein said client apparatus transmits to said control apparatus a data consistency instruction for the data written in said cache apparatus, after accessing said cache apparatus and writing the data therein when including in the access request a data writing instruction.

3. The data access responding system as claimed in claim 2, wherein:
said cache apparatus responds to an instruction received from said control apparatus which has received the data consistency instruction, and copies the data once written in said cache apparatus then to said storage apparatus.

4. A data access responding system, comprising:
a storage apparatus storing data;

a cache apparatus which acts as a cache for the data stored in said storage apparatus;

a client apparatus processing the data; and a control apparatus managing storage locations of the data in said storage apparatus and in said cache apparatus, which communicate each other via a communication network, wherein:

said client apparatus has a memory having a cache area, and notifying said control apparatus of information concerning said cache area, wherein said control apparatus stores, in said cache area, information of the storage location of the data, for which data an access frequency to said cache apparatus is high, and wherein said client apparatus transmits to said control apparatus a data consistency instruction for the data written in said cache apparatus after accessing said cache apparatus and writing the data therein by including in the access request a data writing instruction.

5. The data access responding system as claimed in claim 4, wherein:

said cache apparatus responds to an instruction received from said control apparatus which has received the data consistency instruction, and copies the data once written in said cache apparatus then to said storage apparatus.

6. A data access responding system, comprising:

a storage apparatus storing data;

a cache apparatus which acts as a cache for the data stored in said storage apparatus;

a client apparatus processing the data; and a control apparatus managing storage locations of the data in said storage apparatus and in said cache apparatus, which communicate each other via a communication network, wherein:

said client apparatus has a memory having a cache area, and notifying said control apparatus of information concerning said cache area, wherein said client apparatus carries out self management of the data for which the access frequency is high, requests said control apparatus for the information concerning the storage location of the data having a predetermined access frequency, and stores the information of the storage location in said cache area, and wherein said client apparatus transmits to said control apparatus a data consistency instruction for the data written in said cache apparatus after accessing said cache apparatus and writing the data therein by including in the access request a data writing instruction.

7. The data access responding system as claimed in claim 6, wherein:

said cache apparatus responds to an instruction received from said control apparatus which has received the data consistency instruction, and copies the data once written in said cache apparatus then to said storage apparatus.

* * * * *